Feb. 16, 1937.  E. H. PLACKE  2,071,141
ACCOUNTING MACHINE
Filed Feb. 24, 1933  14 Sheets-Sheet 3

Inventor
Everett H. Placke
By
His Attorney

Feb. 16, 1937.  E. H. PLACKE  2,071,141
ACCOUNTING MACHINE
Filed Feb. 24, 1933   14 Sheets-Sheet 4
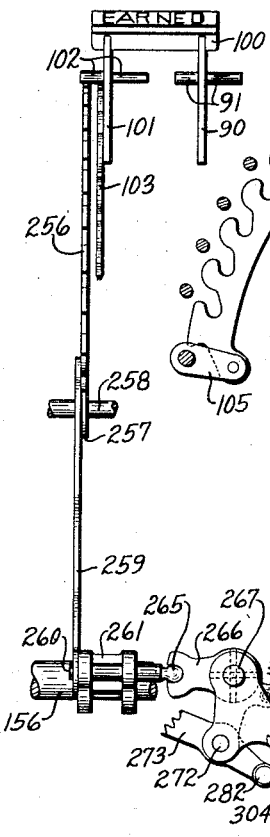
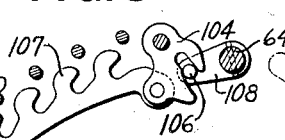
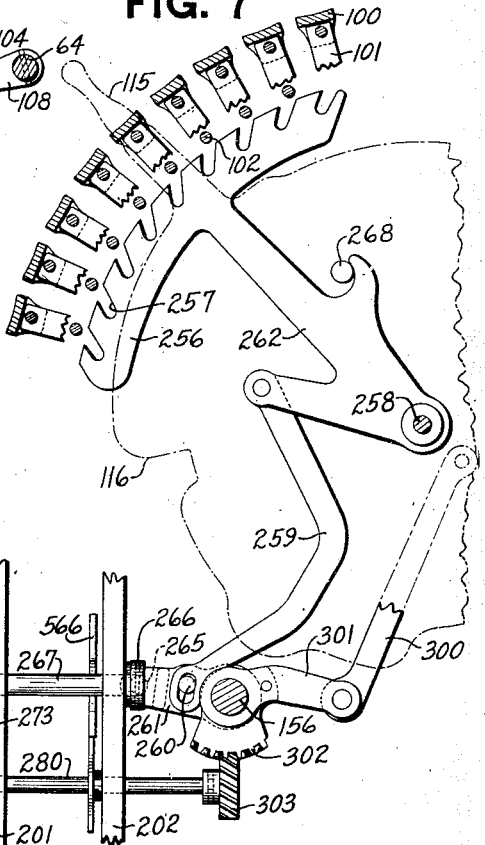
Inventor
Everett H. Placke
By
His Attorney Feb. 16, 1937.  E. H. PLACKE  2,071,141
ACCOUNTING MACHINE
Filed Feb. 24, 1933  14 Sheets-Sheet 5
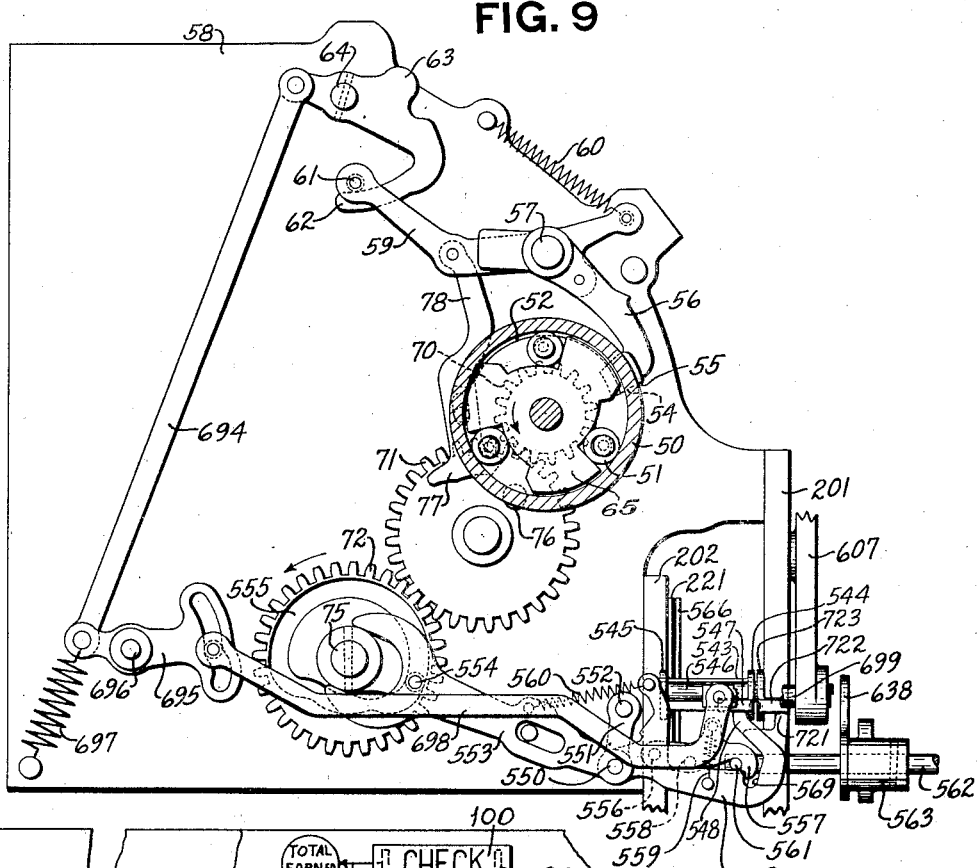
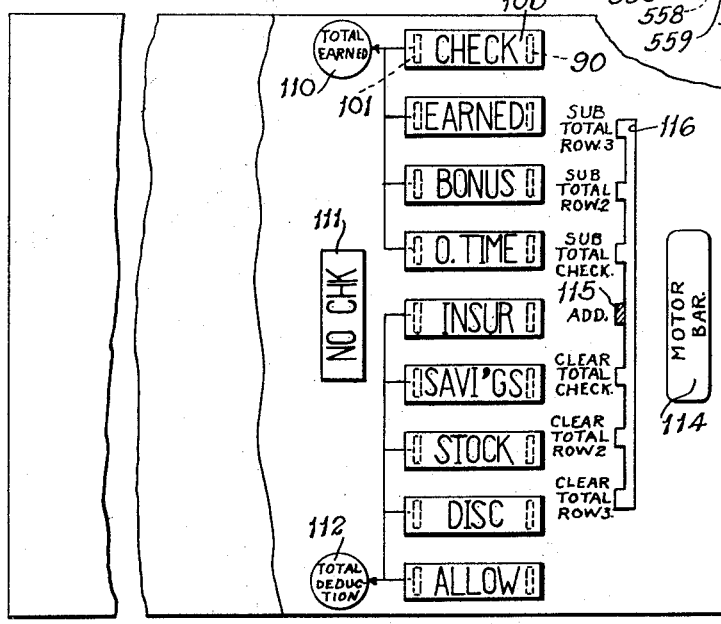
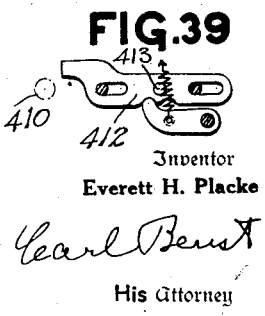
Inventor
Everett H. Placke
By Pearl Benst
His Attorney Feb. 16, 1937.  E. H. PLACKE  2,071,141
ACCOUNTING MACHINE
Filed Feb. 24, 1933  14 Sheets-Sheet 6
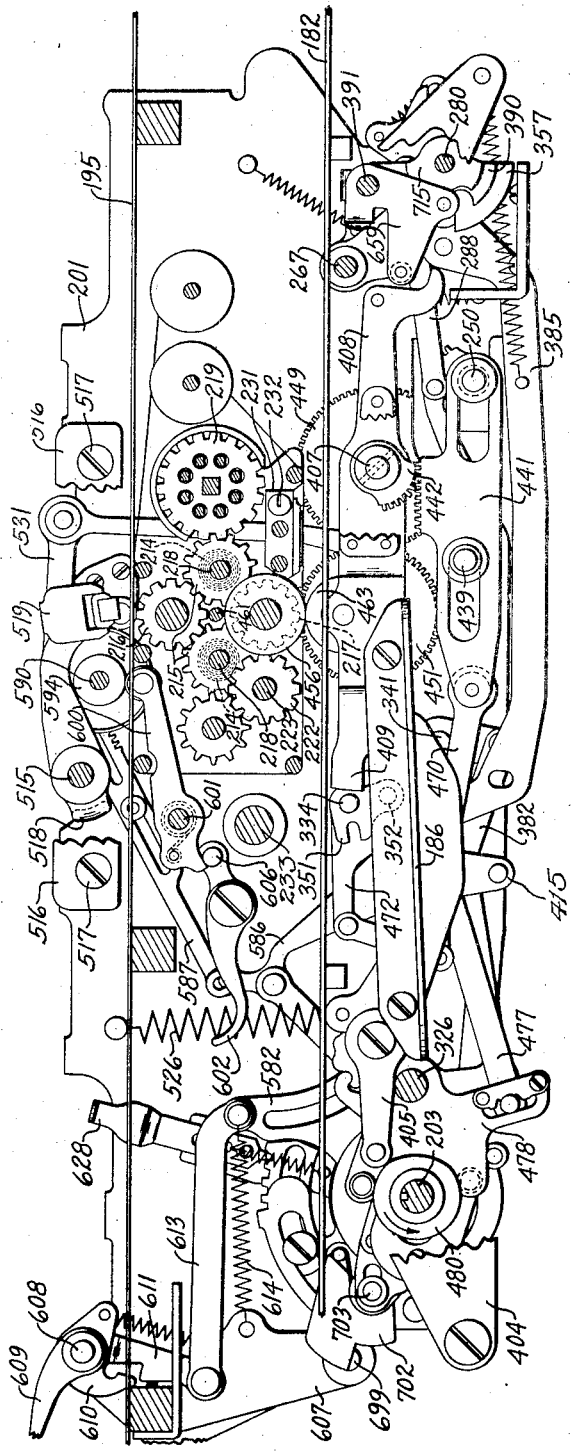
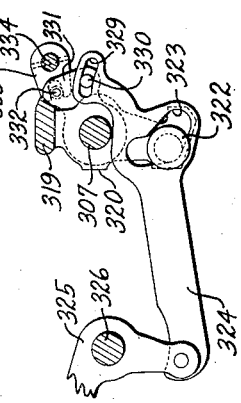
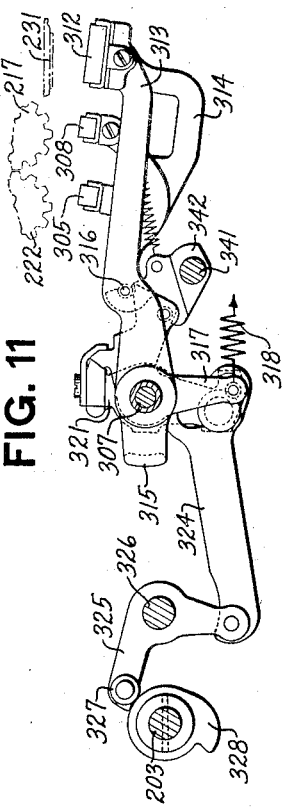
Inventor
Everett H. Placke
By
Earl Beust
His Attorney Feb. 16, 1937.   E. H. PLACKE   2,071,141
ACCOUNTING MACHINE
Filed Feb. 24, 1933   14 Sheets-Sheet 7

Inventor
Everett H. Placke
By
Carl Berust
His Attorney

Feb. 16, 1937.  E. H. PLACKE  2,071,141
ACCOUNTING MACHINE
Filed Feb. 24, 1933  14 Sheets-Sheet 8
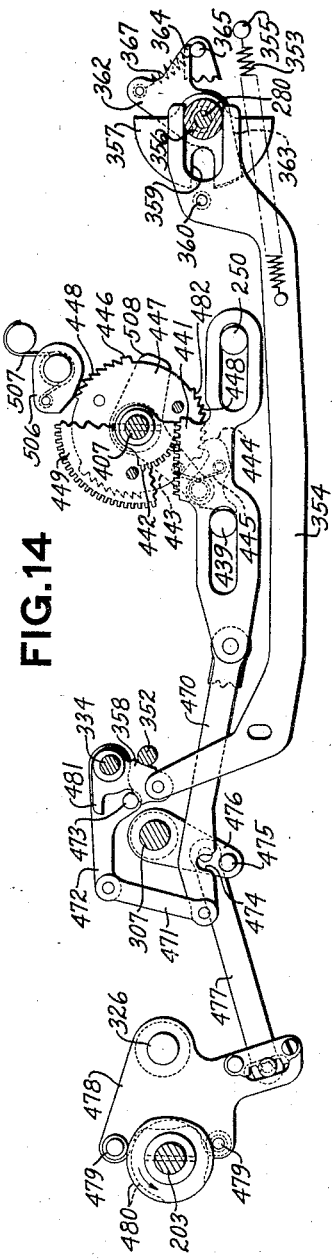
Inventor
Everett H. Placke
By
Hearl Benst
His Attorney

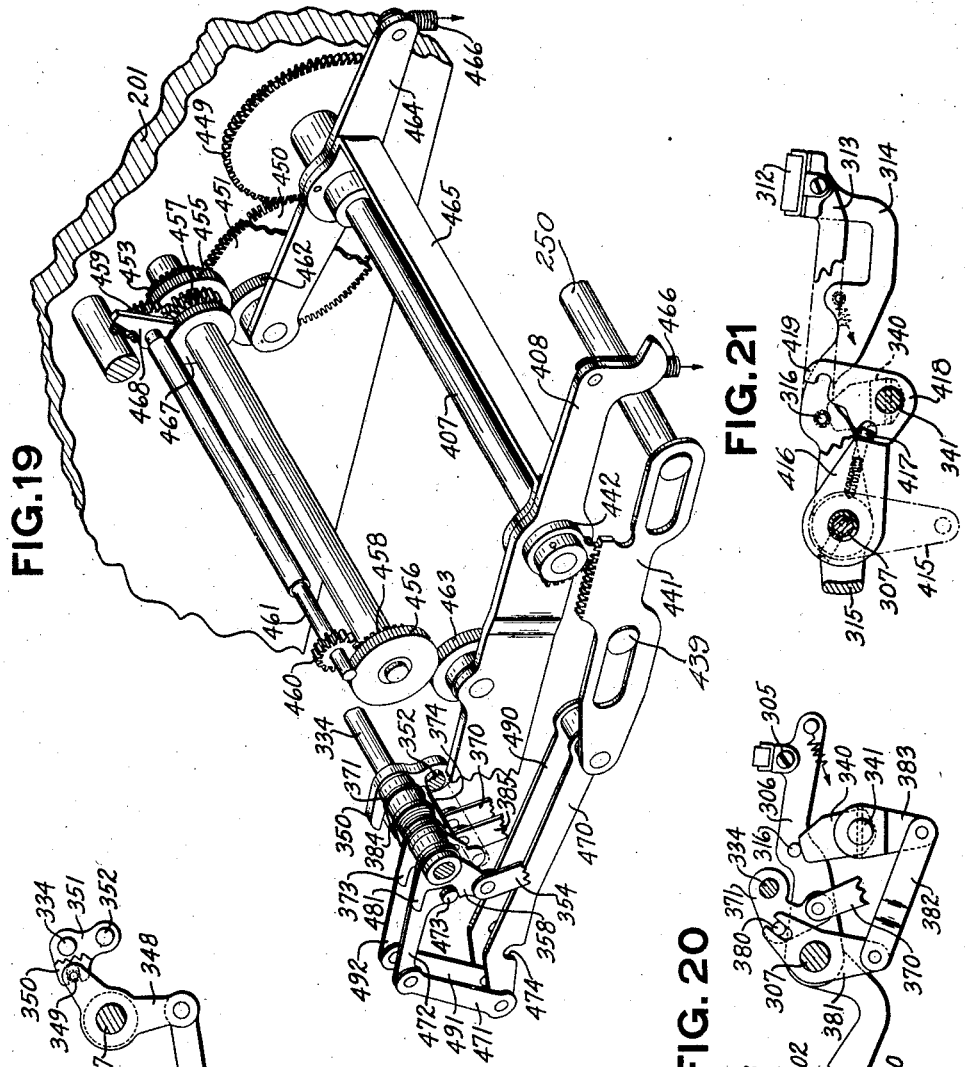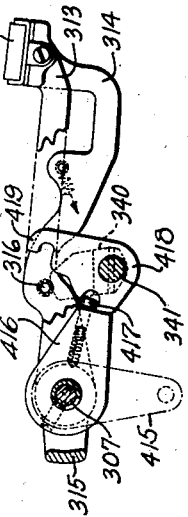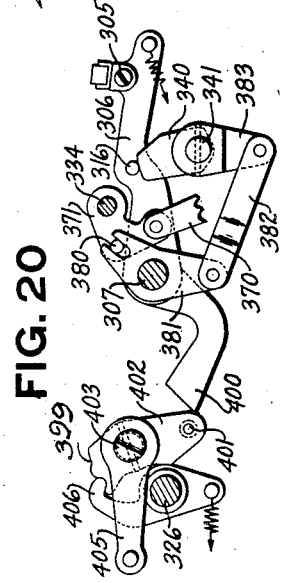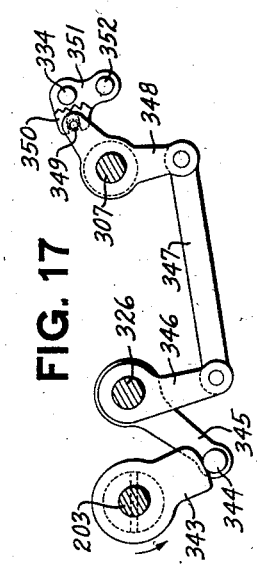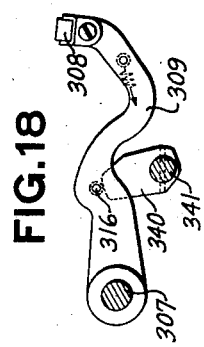

Feb. 16, 1937.  E. H. PLACKE  2,071,141
ACCOUNTING MACHINE
Filed Feb. 24, 1933  14 Sheets-Sheet 10
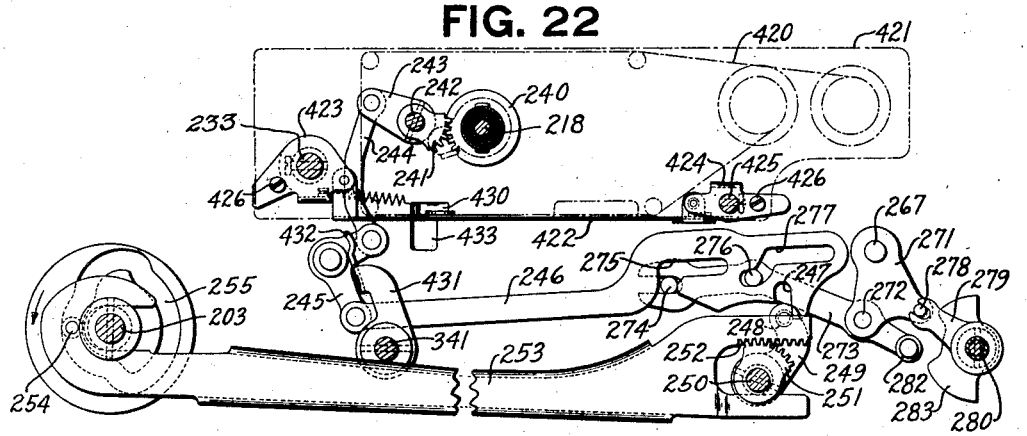
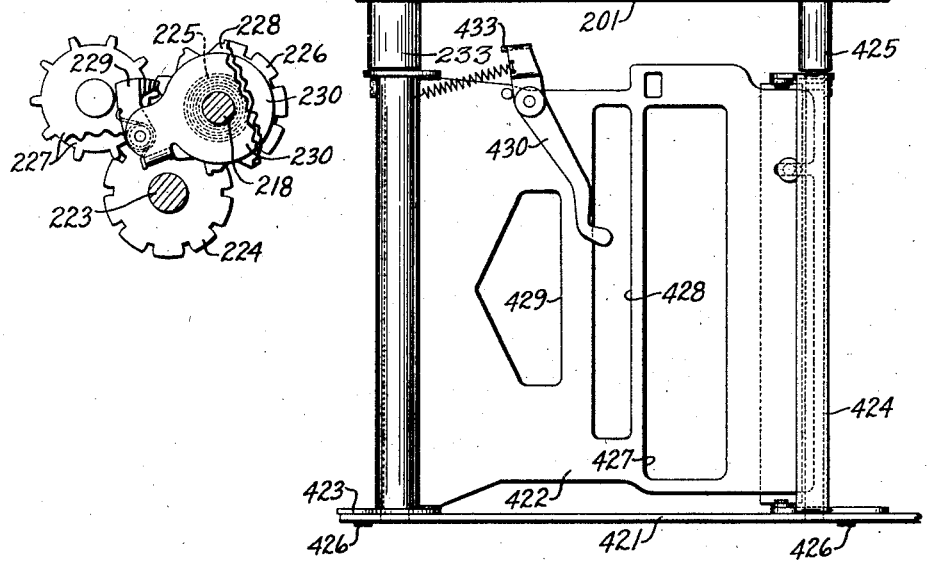
Inventor
Everett H. Placke
By
Earl Beust
His Attorney Feb. 16, 1937.  E. H. PLACKE  2,071,141
ACCOUNTING MACHINE
Filed Feb. 24, 1933   14 Sheets—Sheet 11

Inventor
Everett H. Placke
By Carl Beust
His Attorney

Feb. 16, 1937.  E. H. PLACKE  2,071,141
ACCOUNTING MACHINE
Filed Feb. 24, 1933  14 Sheets—Sheet 12
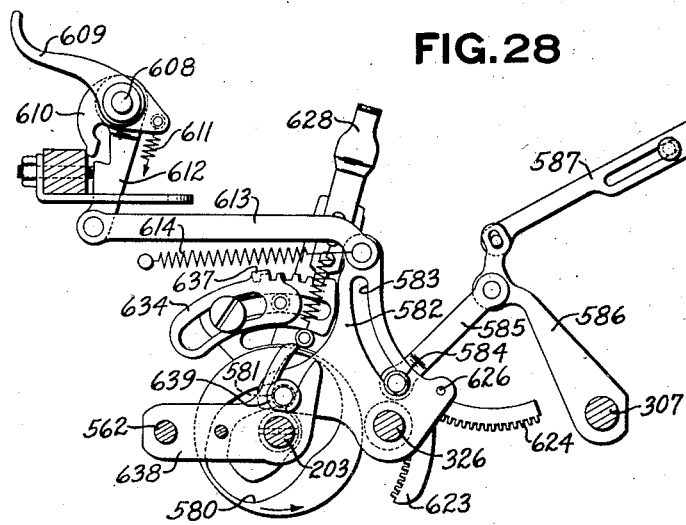
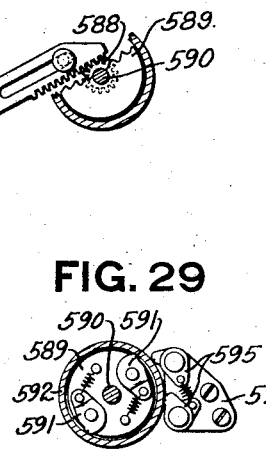
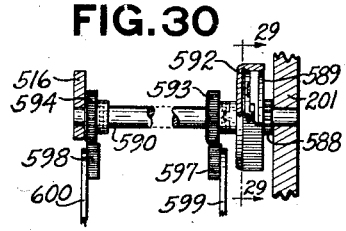
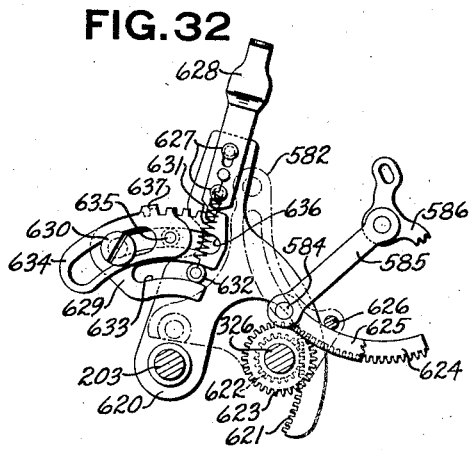
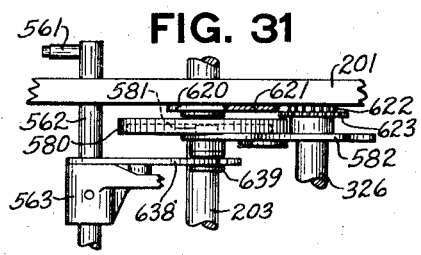
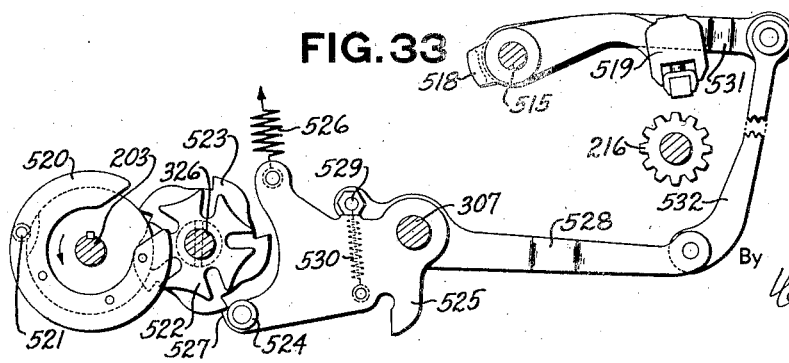
Inventor
Everett H. Placke
By
His Attorney Feb. 16, 1937.  E. H. PLACKE  2,071,141
ACCOUNTING MACHINE
Filed Feb. 24, 1933   14 Sheets-Sheet 13

FIG. 34

| CLOCK NO. | NAME | CHECK NO. | AUDIT | AMOUNT | SYMBOL | REMARKS |
|---|---|---|---|---|---|---|
| \multicolumn{7}{c}{THE X. Y. Z. COMPANY} | | | | | | |

THE X. Y. Z. COMPANY
PAYROLL SHEET

DEPARTMENT                WEEK ENDING

| CLOCK NO. | NAME | CHECK NO. | AUDIT | AMOUNT | SYMBOL | REMARKS |
|---|---|---|---|---|---|---|
| 2170 | JOHN DOE | 107110 | | $*****55.00 | | |
| 2171 | RICHARD ROE | 107111 | | $******35.25 | | |
| 2172 | RICHARD DOE | 107112 | | $******42.50 | | |
| 2173 | JOHN ROE | 107113 | | $******37.00 | | |
| 2174 | JOHN SMITH | 107114 | | $******41.75 | | |
| 2175 | | | | | | |

435 →
GROSS **265.00
DISC. ****2.65

262.35.

265.00
2.65

437 →

THE BLANK CO.

PAY TO THE ORDER OF    APR. 11-1932   107141

JOHN DOE

PAY $***262 AND 35 CTS. AMT $ 262.35

THE NATIONAL BANK    John C. Doe      Richard Roe
                     PRESIDENT        TREASURER 191                                       192

Inventor
Everett H. Placke
By  Earl Beust
His Attorney

Feb. 16, 1937.         E. H. PLACKE                    2,071,141
                    ACCOUNTING MACHINE
                Filed Feb. 24, 1933    14 Sheets-Sheet 14

FIG. 36

```
                    THE BLANK CO.              EARNED   55.55
                                               BONUS     5.00
  PAY TO THE ORDER OF         APR-10-1932 107110  O.TIME   6.00
                                               INS.      0.55
   2170    JOHN DOE                            SAVE.     5.00
                                               STOCK.    6.00

PAY$******55AND00CTS AMT$   55.00

John C. Doe  DIVISION
  THE NATIONAL BANK.       PAYMASTER      3
```

```
                    THE BLANK CO.

PAY TO THE ORDER OF         APR-11-1932 107111

2171    RICHARD ROE.

PAY$******35AND25CTS AMT$   35.25

John C. Doe  DIVISION
  THE NATIONAL BANK.       PAYMASTER      3
```

FIG. 37

```
                    THE BLANK CO.              EARNED   20.65
                                               BONUS     2.00
  PAY TO THE ORDER OF    APR-11-1932 107442   INS.       .65

1021    JOHN DOE.

PAY$******22AND00CTS. AMT$   22.00

John C. Doe  DIVISION
  THE NATIONAL BANK        PAYMASTER      3
```

```
                    THE BLANK CO.

PAY TO THE ORDER OF    APR-11-1932 107443

1022    RICHARD ROE.

PAY$******7AND11CTS. AMT$   7.11

John C. Doe  DIVISION
  THE NATIONAL BANK.       PAYMASTER      3
```

Inventor
Everett H. Placke
By
Earl Benst
His Attorney

Patented Feb. 16, 1937

2,071,141

UNITED STATES PATENT OFFICE 2,071,141

ACCOUNTING MACHINE

Everett H. Placke, Dayton, Ohio, assignor to The National Cash Register Company, Dayton, Ohio, a corporation of Maryland Application February 24, 1933, Serial No. 658,314

55 Claims. (Cl. 235—3)

This invention relates to improvements in cash registers, accounting machines and the like, and more particularly to improvements in the printing mechanisms for such machines.

The invention herein, relating more specifically to check-writing and signing mechanisms, is particularly well suited for use in a machine of the general type disclosed in Letters Patent of the United States Nos. 1,619,796; 1,747,397; 1,761,542, and 1,916,535, issued March 1, 1927; February 18, 1930; June 3, 1930, and July 4, 1933 respectively, to B. M. Shipley. Reference is also made to United States Letters Patent No. 1,908,060, issued to Pascal Sburlino on May 9, 1933.

Several different types of cash registers, accounting machines and check writers now on the market are adapted to print amounts on bank checks, drafts, etc., and at the same time register the amounts represented by the checks, or the like, on various totalizers with which the machines are provided. After the checks are printed and the amounts thereof entered into the totalizer or totalizers, according to the system being used, it is necessary that each individual check be signed. As is customary, in large corporations under certain circumstances, as for instance, when preparing dividend checks, profit-sharing checks or payroll checks, the checks or drafts are signed and counter-signed by at least two officials of the company. All of this of course requires a great deal of time and occasions not a little labor.

Moreover, in connection with payrolls, in some companies the employees have their regular wages and certain additional sums coming to them, some of which may be in the form of bonuses or overtime, etc., and at the same time there may be certain deductions to be taken from the employees' wages or salaries, such as insurance, savings and stock payments.

When such payroll systems were used in the past, it has required a considerable amount of time and labor to figure up the balance which the employee had coming to him.

It is, therefore, an object of this invention to provide a cash register or accounting machine of the general type disclosed in the above mentioned Letters Patent and application with novel means to print not only a facsimile on the check or draft of the signature of the paymaster or other officer, as the case may be, but at the same time to print an itemized account of each individual employee's account on his or her pay check. For example, one employee may have earned as his regular wages $55.50. He may have a bonus of $5.00 coming to him and also $6.00 for overtime work. Then there may also be several deductions to be taken from the money which he is to receive on pay-day. For instance, he may have a 55-cent deduction for insurance, a $5.00 deduction for a savings account, and a $6.00 deduction as a payment on stock.

The present invention contemplates a machine which is adapted to print all of the above mentioned items on the wage-earner's pay-check. These items are entered into an add-subtract totalizer and afterward a total is taken wherein the balance is printed underneath the list of items. If a stub-check is being used, this total balance is also printed on the main portion of the check, the items and first mentioned total being printed on the stub-section thereof. The machine also prints a consecutive number and the date. The next employee may not have anything extra coming, or may not have anything to be deducted from his pay, and therefore his check will have merely the total amount of his pay printed on the main and stub portion of the check, along with the consecutive number and date.

In both instances it is to be understood that a facsimile of the signature of the paymaster, or any other designated officer, is also written on the check by the machine. In case plain checks are used instead of the stub-checks, then the items are printed near the righthand edge of the checks. The checks are usually printed in blocks of five checks to the sheet.

It is also another and very important object of this invention to provide a novel feeding mechanism for the checks so that upon depression of certain keys to enter certain items the check receives a definite feed, so that the items are properly spaced from the top of the checks and also from each other. After the items are printed, then upon the printing of the total amount which the employee has coming to him, the check is fed directly to the total printing position from whichever one of the positions in which the last item was printed, regardless of whether it is the first or the sixth item. After the total is printed the machine automatically feeds the check to the starting position of the next check, and upon the subsequent operation of the machine said next check is automatically fed to a position to receive the first item on the employee's pay-check if there is to be an item printed thereon. If, however, there is to be no item, the check is fed directly into position to receive the impression of the total amount of his check.

In other words, it is an object of this invention to provide a feeding mechanism to give the check a variable feed when necessary, as determined by the particular control keys which are operated, or to give the check a definite feed when certain other keys are operated.

Another object of this invention is to control the printing hammers so that when only a single amount is to be printed on the check, all four hammers (there being four shown in this case) are simultaneously operated. Also all four of these hammers are operated whenever the total of an itemized account is printed upon the check. When only the items are printed, three of the hammers are disabled during the printing of such items.

Another object of this invention is to provide a means for printing what is known as a payroll sheet, upon which sheet is usually printed the total of the amounts coming to the various employees.

It is to be understood that if desirable the items may also be printed on the payroll sheet.

Another object of this invention is to provide the machine with mechanism for printing what are known as voucher checks. When printing voucher checks the items are printed on the voucher portion thereof, after which a sub-total operation is made which prints the balance of the items, but leaves that amount in the totalizer. During this sub-total operation the hammers are all rendered ineffective except the item printing hammer which in this case prints the sub-total or balance of the items.

After the sub-total has been printed on the voucher portion of the check, the check is fed into the machine and then on the clear-total operation the check is fed into a position to receive an impression of the total amount of the balance, the date, consecutive number and facsimile of one or more of the officers of the company or bank drawing such check.

Another object of this invention is to provide means in the machine for absolutely preventing an operation of the machine unless both a payroll sheet and check are in the machine and in proper positions to receive the printed impressions as determined by the set-up on the keyboard of the machine.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

Of said drawings:

Fig. 5 is an end view of the consecutive number disabling mechanism controlled by the second control bank.

Fig. 6 is a detail of the locking detent for the second control bank.

Fig. 7 is a side elevation of Fig. 5 with the locking detent omitted.

Fig. 8 shows the consecutive number control cam and pitman.

Fig. 9 shows the machine drive and a portion of the payroll sheet feed and upper printer controlling mechanism.

Fig. 10 is a front view of the improved printer.

Fig. 11 is a detail view of the lower impression hammers.

Fig. 12 is a detail view of the driving mechanism for the lower impression hammers.

Fig. 14 shows the item or "short feed" controlling mechanism and also the connection to the check hammer control line.

Fig. 15 shows the "variable" and "long feed" controlling mechanisms and also the connection to the check hammer control line.

Fig. 16 shows the voucher check feed control and the connection to the check hammer control line.

Fig. 17 shows the check hammer and check feed disabling mechanism.

Fig. 18 shows the amount hammer in its disabled position.

Fig. 19 is a perspective view showing the check feeding mechanism.

Fig. 20 shows the consecutive number hammer in disabled position and also the manual and automatic means for disabling the consecutive number hammer.

Fig. 21 shows the signature hammer in disabled position and the manual and automatic means for disabling the same.

Fig. 22 shows the driving mechanism for the consecutive number actuating means and also shows the blur shield control.

Fig. 23 shows the consecutive number actuating means.

Fig. 24 shows a plan view of the blur shield.

Fig. 28 shows the payroll sheet feeding mechanism.

Fig. 29 is a detail of the driving and retaining pawl for the payroll sheet feeding mechanism.

Fig. 30 is an end view of the payroll sheet feeding shaft and the feeding rollers for said sheet.

Fig. 31 is a plan view of the payroll sheet feeding disabling mechanism.

Fig. 32 shows the manual control of the length of the feed for payroll sheet.

Fig. 33 shows the payroll sheet hammer operating mechanism.

Fig. 34 shows a facsimile of a portion of a payroll sheet.

Fig. 35 shows a facsimile of a voucher check.

Fig. 36 shows a facsimile of two stub checks of a stub check sheet.

Fig. 37 shows a facsimile of two checks of the plain check sheet.

Fig. 38 is a diagrammatic view of a part of the keyboard.

Fig. 39 is a detail view of the mechanism for maintaining the feed rolls separated.

General description

Figure 1:
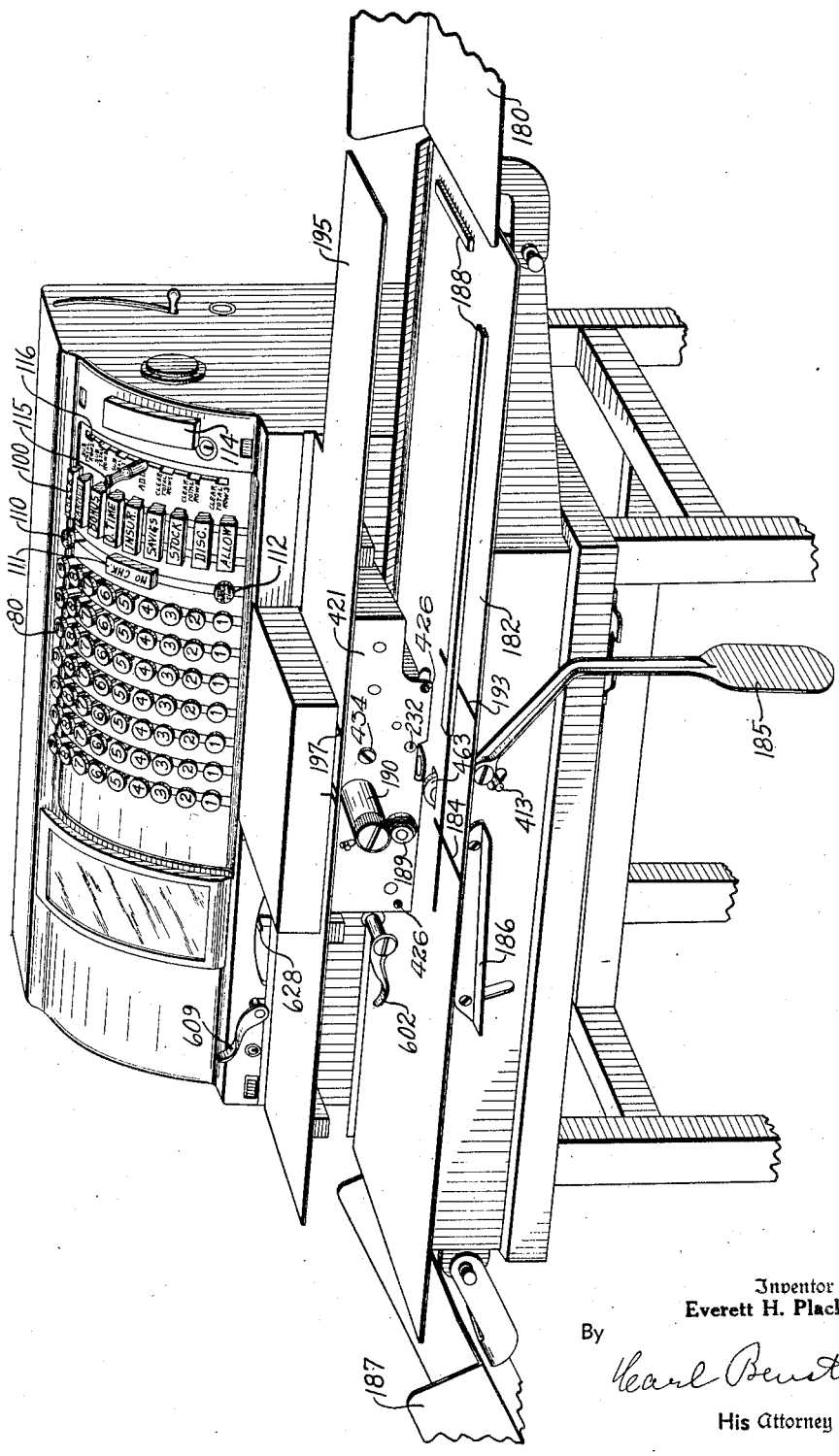
Fig. 1 is a perspective view of the machine embodying the present invention.

Described in general terms, the machine embodying the present invention is one particularly suited for use in factories and other institutions where they have a comparatively large payroll. By this invention itemized checks may be printed, the items added to, or subtracted from, a balance totalizer as is determined by the particular control keys operated, and the balance of the several items may be taken from the balance totalizer and printed on the check as the amount payable by that check. Single item checks and voucher checks also may be printed, the latter having the various items and a total of the items printed on the voucher section. The total is also printed on the check. The check can therefore be detached from the voucher section.

While the machine as shown herein is adapted to be used and will be described as being used by an institution to issue their payroll checks it is to be distinctly understood that the invention is not limited to the particular form shown or described, but may be used in many other ways and in many other places where checks are to be issued without in any way departing from the spirit of the invention.

The checks adapted to be used in this machine are usually printed in blocks of five, but that number may also vary.

In making up a payroll, the operator takes a block of five checks and places them in the machine on the lower printing table. A payroll sheet is placed in the machine on the upper table. If the first employee has earned extra money through bonuses or overtime, the operator first enters the regular amount of money earned into the machine, then he enters the amount of the bonus and then enters the amount coming from overtime. Upon each of these three operations the amount is entered into the machine in an add and subtract or balance totalizer and each item is printed near the righthand edge of the check. Each item is also entered into a separate totalizer, one of which is adapted to accumulate all of the amounts earned, another all of the bonuses, and a third all of the amounts for the overtime. Should the employee have any amounts to be deducted, such as insurance, savings, or stock, these several items are set up on the keyboard of the machine and entered into the machine and subtracted from the total amount of money, namely, the earned, bonus and overtime. After this is done, a total is taken during which total operation the balance of the amount, or in other words the amount of money which the employee has coming, is printed underneath the items and also printed on the main body of the check when stub checks are being issued. In case plain checks are issued, then the items and the total thereof are printed at the righthand end and the balance or total is also printed near the center of the check.

The machine is equipped with means to prevent an operation thereof unless the payroll sheet and check are in their proper positions in the machine. During the taking of the total or balance of the items, this total or balance is at the same time printed on the payroll sheet.

In case the employee has not earned any additional money or does not have anything to be taken out of his pay, then the operator sets up the total amount of pay coming to him, which is printed in two places on the check, the machine automatically taking care of the feed so that the print will take place in the proper position when such a check is to be issued following an itemized check.

In many instances these checks are printed in blank form ahead of time with the employee's name and number thereon, and it may be that perhaps the employee did not work, and therefore, would not have any money coming. So in that case all the operator does is to put the machine through an operation by the depression of a "No check" key, which takes care of automatically feeding the check sheet to the next position and prints zeros on that check.

Described in general terms, the machine which is used to illustrate the present invention, which is capable of performing all of the functions above enumerated, is provided with several banks of amount keys, three banks of control keys, a total lever and motor bar. The keys of the first and second control banks are connected together by bars so that the depression of such bar depresses the corresponding key in each bank. There is also associated with each of the control banks a differential mechanism of the type illustrated and described in the above mentioned Shipley patents. The differential mechanisms associated with the amount key bank are also identical with those shown and described in said Shipley patents.

The machine also has three totalizer lines, namely, a front, back and upper line. On the upper totalizer line there is only one totalizer, which is an add and subtract or balance totalizer of a type identical with that shown in said Shipley patents. On the front totalizer line there are in the present machine two totalizers and on the rear totalizer line there are nine totalizers, one for each of the positions (namely nine) in the second control bank.

The mechanism associated with the total lever is not shown in this application, as it is identical with that shown and described in the above mentioned Shipley patents. Likewise the motor bar mechanism, that is, the mechanism which releases the machine upon depression of the motor bar is not shown, as it is also old in the art as shown in these Shipley patents.

By referring to Figure 1 it can be seen that the printing mechanisms are arranged in the front of the machine as is usual in machines of this type. Associated with the upper printer is a long table upon which are to be laid the payroll sheets to receive their printed impressions from the upper printer. Associated with the lower printer is also a long table upon which are to be placed the blocks of five checks which are automatically fed from right to left to receive the printed data thereon from the machine.

*Operating mechanism*

The present machine may be operated either by an electric motor or by a crank handle, as desired. Any suitable type of motor may be used, such as that fully illustrated and described in United States Letters Patent to C. F. Kettering and W. A. Chryst No. 1,144,418, granted June 29, 1915, and it is therefore thought unnecessary to show any motor herein. The motor is adapted to drive a clutch mechanism shown in Fig. 9, which is old and well known in the art. A very brief description thereof is therefore considered sufficient.

The motor drives a clutch shell $5^a$, adapted to cooperate with three rollers 51, loosely mounted on pins carried by a disk 52. The disk 52 has a shoulder 54 normally engaged by a stop 55 carried by a lever 56 loosely mounted on a stud 57 supported in a side frame 58 of the machine. Fast to the lever 56 is an arm 59 normally under tension in a counterclockwise direction due to a spring 60 extending between the end of said arm and a stud on the frame 58. At its opposite end the arm carries a pin 61 which cooperates with a hook 62 of a lever 63 fast on a shaft 64 supported by the side frame 58 and another side frame of the machine (not shown). This hook 62 normally prevents the lever 59, and therefore the arm 56 from being rocked counterclockwise to remove the stop 55 from the shoulder 54 of the disk 52.

When the machine is released the shaft 64 is rocked counterclockwise by mechanism which is old and well known in the art and fully illustrated and described in the above mentioned Shipley patents, which rocks the hook 62 from under the pin 61 and permits the arm 59 to rock counterclockwise, thereby moving the stop 55 away from the shoulder 54.

When the stop 55 is released from the shoulder 54 of the disk 52 the mechanism included in the clutch which is fully illustrated and described in the above mentioned Shipley patents causes the circuit to be closed to the motor whereupon the shell 55 is driven, which through the rollers 51 operates the disk 65.

Connected to this disk 65 is a pinion 70, meshing with an intermediate gear 71, which in turn meshes with a gear 72 secured to a main operating shaft 75 supported by the machine side frames.

The motor through the clutch and train of gears just described drives the main operating shaft 75 one complete rotation for each operation of the machine.

The gear 71 carries a pin 76 which pin when the gear 71 nears the end of its rotation contacts a foot 77 of an arm 78 pivoted to the arm 59. As the gear 71 continues home the pin 76 raises the arm 78 and rocks the arm 59 and lever 56 clockwise far enough for the hook 62 to pass beneath the pin 61 on the arm 59 and hold said arm and the lever 56 in their normal positions. When the lever 56 is rocked, as just described, the stop 55 is moved into the path of the shoulder 54 of the disk 52 to stop the machine in its home or normal position.

KEYBOARD

Amount keys

Figure 2:
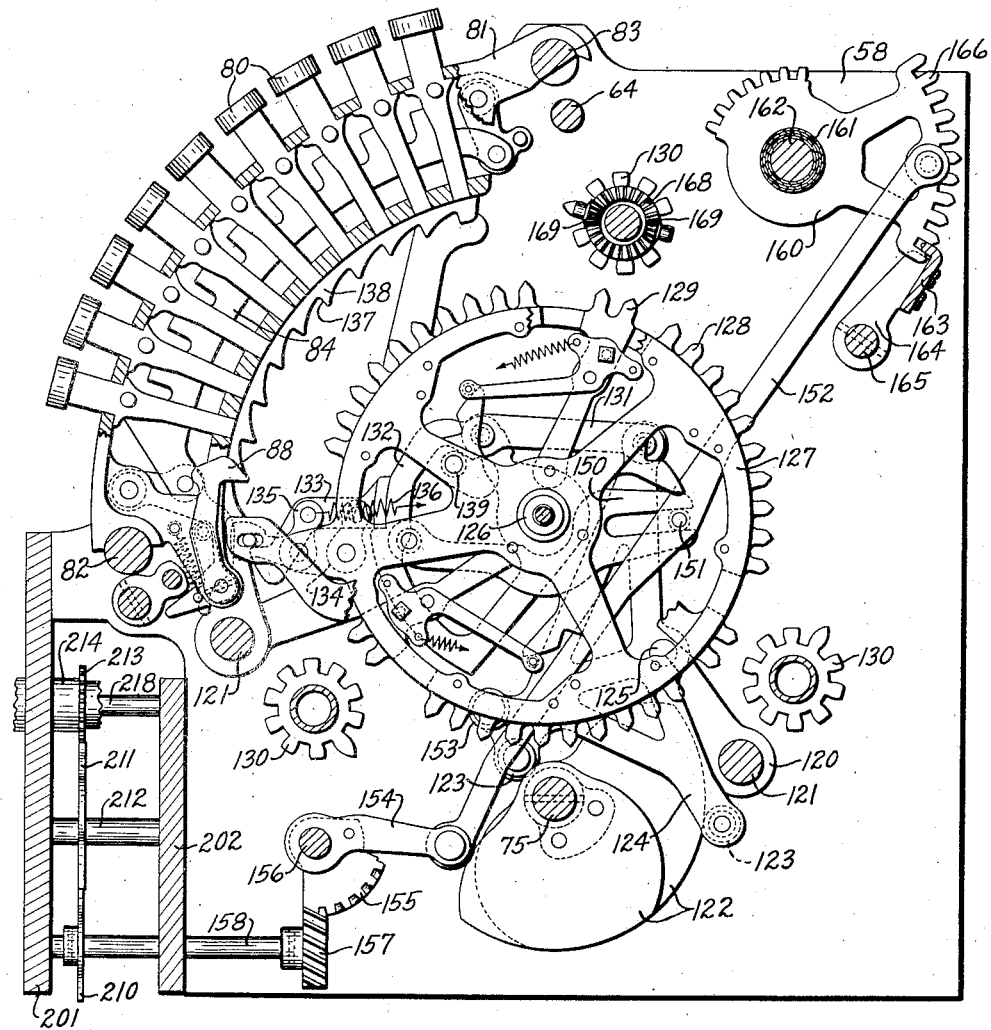
Fig. 2 is a section taken along the side of one of the amount banks.

In the illustrative machine there are seven banks of amount keys 80 (Figs. 1, 2 and 38). These amount banks are identically the same as the amount banks shown and described in the above mentioned Shipley patents, and therefore but a brief description thereof will be given herein. The keys 80 are slidably mounted in key frames 81, supported at their lower ends upon a rod 82 and at their upper ends upon a rod 83. Each of these keys 80 cooperates with a control bar 84 and a locking bar (not shown) and is held in its normal outer position by the usual key-restoring spring (not shown). The keys are released near the end of the operation of the machine in the manner shown and described in a patent to B. M. Shipley No. 1,789,418 dated January 20, 1931.

Cooperating with each bank of keys is a zero stop pawl 88 (Fig. 2) the function of which is to stop the differential mechanism in the zero position when no key in that respective bank is depressed. The zero stop pawls 88 and their functions are fully illustrated and described in the above mentioned Shipley patents, and it is therefore thought unnecessary to go into any further description thereof.

Control keys

As previously stated in the general description, the control keys in the first and second control banks are tied together by bars. Keys 90 (Figs. 3, 5 and 38) in the first control bank are supported by a key frame 81 similar to the amount key frame 81. The keys 90 have pins 91 extending from both sides thereof, as shown in Fig. 5. That portion of the pin 91 which extends toward the left cooperates with a detent 92 supported by arms 93 and 94 carried by the key frame 81. The arm 94 is of the usual type for cooperating with the zero stop pawl 88 associated with this first control bank of keys. The slots 95 in the detent 92 which cooperate with the five lower keys are straight, so that when any one of those keys is depressed the detent will not be moved; therefore the zero stop pawl will remain in the position shown in Fig. 3, causing the differential mechanism associated with this bank, and which will be later described, to be stopped in the zero position to select the subtract side of the add and subtract or balance totalizer hereinafter referred to. The four upper keys 90 cooperate with surfaces 96 on the detent 92 so that when any one of those keys is depressed the detent is moved downwardly, the zero stop pawl 88 is drawn out of the path of the differential mechanism, thus causing the latter to be set in a position according to the key which has been depressed whereby the plus side of the add and subtract or balance totalizer is selected for operation.

Keys 90 in the first control bank are connected by bars 100 (Figs. 3, 5 and 7) to keys 101 in the second control bank. These keys 101 are substantially identical with the keys 90. Neither the key frames nor the differential mechanism associated with this bank are shown, as they are identically the same as those shown in Fig. 3, associated with the first bank of control keys.

These keys 101 cooperate with a detent (not shown) similar to the detent 92 except that all of the key pins 102 of these keys cooperate with surfaces similar to the surfaces 96, so that whenever any one of the keys 101 is depressed by means of the bar 100, the zero stop pawl 88 associated with this bank of keys 101 is moved out of the path of the differential mechanism for the second control bank, so that the totalizers hereinafter mentioned can be selected according to the position of the key 101 which has been depressed.

Associated with the keys 101 is a locking detent 103 (Figs. 5 and 6) which detent is supported by arms 104 and 105 carried by the key frame 81 for the second control bank of keys. Cooperating with the arm 104 is a pin 106 carried by an arm 108, secured to the previously described shaft 64, which when the machine is released is rocked in a clockwise direction, as viewed in Fig. 6. Such movement of this shaft through the arm 108 and pin 106 moves the detent upwardly whereby the projections 107 associated with the depressed key 101 is moved over the pin 102 of that key, locking the same in depressed position and of course simultaneously locking the key 90 in its depressed position. The projections 107 also pass beneath the pins 102 of the undepressed keys, thus preventing them from being depressed during the operation of the machine.

In the third control bank there are only three keys, which are shown only in Figs. 1 and 38. The frame for supporting these keys and the detent associated with them are not shown, as they are substantially the same as those shown in Fig. 3 in connection with the first control bank. Moreover the differential mechanism associated with this bank of keys is also not shown. The upper key 110 marked "Total earned" is used only for taking the total of a totalizer on the front line of totalizers in which totalizer is accumulated the total amount of checks issued, the total of money earned, the total of bonuses and the total of overtime, which amounts are entered into the machine when the same is controlled by the depression of the four upper bars 100. The "No check" key or bar 111 is used only when there is to be no amount printed on a check, such as when an employee has not been working during the week but his check has been preprinted and perhaps falls in the center or even on the end of a block of five checks.

The key 112 marked "Total deduction" is used for the purpose of taking the total of the insurance, savings, stocks, discounts and allowances, which are entered into the machine when the same is controlled by the operation of the five lower bars 100.

Motor bar

Machines of the type herein illustrated are usually electrically operated, and in order to facilitate the rapid operation of the machine a large motor bar or key 114 (Figs. 1 and 38) is provided, which can be easily struck to release the machine for certain types of operations. The manner in which this release of the machine by the motor bar 114 is accomplished is fully illustrated and described in the above mentioned Shipley Patent No. 1,761,542, and reference may be had to this patent for a complete illustration and description of the motor bar operation.

Total lever

Referring particularly to Figs. 1, 7 and 38, the present machine is provided with a total lever 115 which projects through a raceway 116 in the machine cabinet, between the key bars 100 and the motor bar 114. This lever 115 is integral with a substantially circular plate 116 and is adapted to control the various totalizer lines on totalizing operations, as well as other functions which need not be considered in detail at present. It is thought sufficient to say here that the total lever selects the totalizer line to be rocked into engagement with the actuators on totalizing operations. The mechanism associated with this total lever is not shown nor will it be described in detail in this case as such mechanism is substantially identical with that shown in the previously mentioned Shipley patents to which reference may be had for such illustration and description.

The various functional controls of the total lever 115 over the machine will be discussed later on in this specification as the necessity therefor arises.

Differential mechanism

The differential mechanism of the machine is employed to differentially operate the different totalizers and to select them for operation, and also to set type carriers in the printing mechanism as controlled by the banks of keys. The amount differential mechanism will be described first.

Amount differential mechanism

There is one complete differential unit for each amount bank, but as they are all identical in construction and operation, only one will be described.

Each amount differential unit (Fig. 2) is supported by the usual hangers 120 mounted on rods 121 and guided at their upper ends between the key frames 81.

To drive the differential mechanism of the machine, the drive shaft 75 is provided with a plurality of pairs of cams 122, each pair co-operating with rollers 123 carried by a Y-shaped lever 124 of which there is one for each bank of keys in the machine. This lever 124 is pivoted at 125 to the hanger 120.

Loosely mounted on hollow studs 126 carried by the hangers 120 are differentially movable actuators 127 carrying racks 128 and transfer arms 129 for operating totalizer pinions 130. The levers 124 at their upper ends are connected by links 131 to driving segments 132 loose on the hollow studs 126. The driving segments 132 adjacent the banks of amount keys are connected to the differentially movable actuators 127 by latches 133 each of which is supported by an arm 134 and a lever 135 pivoted on the corresponding differentially movable actuator. A spring 136 holds the rear ends of the latches 133 in engagement with shoulders on the driving segments 132.

When the segments 132 are driven by their cams 122 the differentially movable actuators 127 are carried, with their latches, up to points where the forwardly extending arms of the levers 135 engage the inner ends of the depressed amount keys 80. Such engagement results in the disengagement of the latches from the driving segments and the engagement of the forward ends of the latches with the particular one of a series of notches 137 formed in a bar 138 supported by the particular hanger 120 which is opposite the latch when it is disengaged. Upon the return movement of each driving segment 132 to normal position, a pin 139 mounted on the associated differentially movable actuator 127 is engaged by the inside of the driving segment 132 and said actuator 127 is returned thereby to its normal position.

If a key is not depressed in an amount bank, the zero stop pawl 88 therefor operates the latch to arrest the differentially movable actuator 127 in its zero position. However, when a key is depressed the zero stop pawl 88 is moved out of its operative position, as previously described.

Control differential units

This machine has three control bank differential units, one for the keys 90, one for the keys 101, and one for the third row of keys 110, 111 and 112.

The differential associated with the keys 90 selects either the add or the subtract side of the balance totalizer. The differential mechanism associated with the keys 101 selects the totalizers on the back totalizer line, depending upon which of the keys is depressed and the differential unit associated with the keys in the third row selects the proper totalizer in the front totalizer line, depending upon the key which is depressed.

Since all three of these differential units are exactly alike, only one of them has been illustrated and that particular one will be described but briefly, since it is substantially the same as that illustrated and described in the above mentioned Shipley patents.

Figure 3:
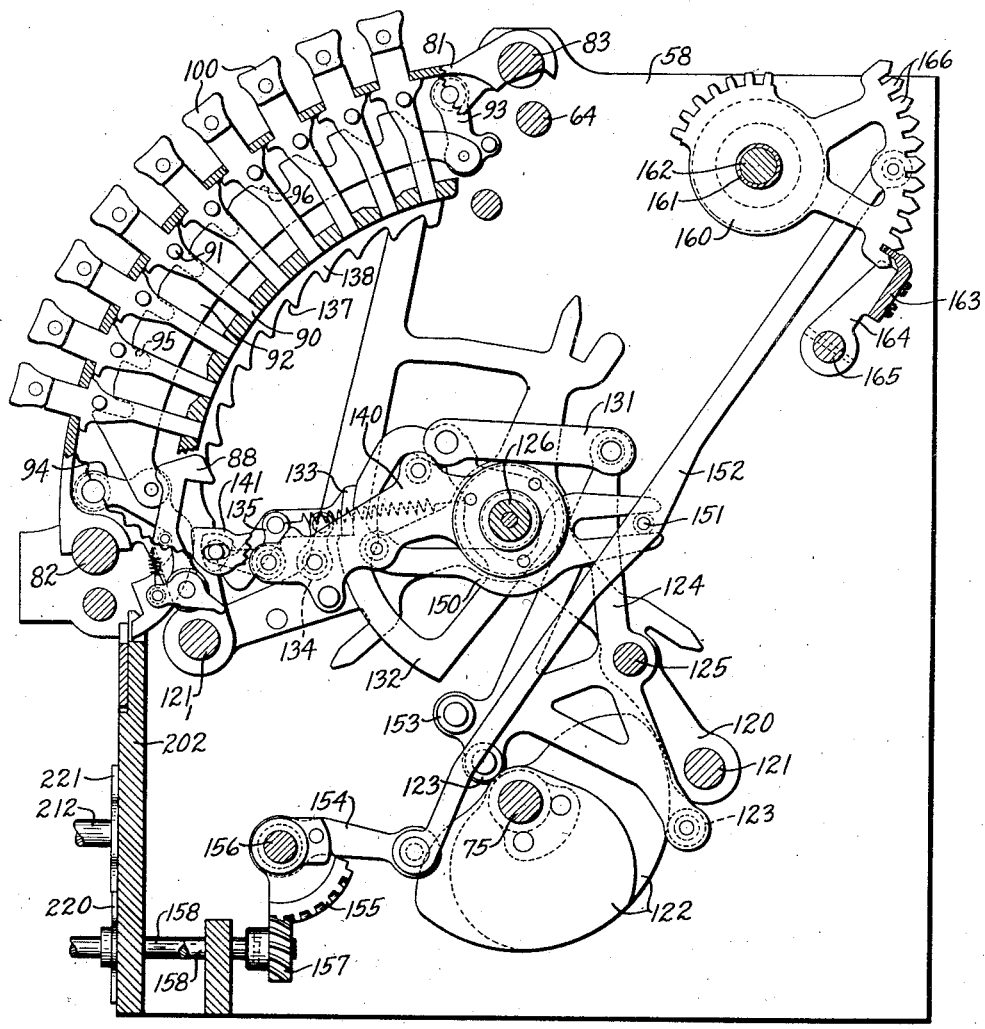
Fig. 3 is a section taken alongside the right-hand control bank.

As the three control banks serve to select the totalizers, as above stated, but not to accumulate thereon, no differentially movable racks are used in connection with these banks. In Fig. 3 is illustrated the differential mechanism associated with the keys 90 in the first row.

With the exception of the fact that these control bank differentials do not have differentially movable racks associated therewith they are quite similar to the differential unit shown and described for the amount banks and for this reason the same reference numerals are used to indicate like parts. These control differentials are supported by hangers 120. A pair of cams 122 through rollers 123, drive a Y-shaped lever 124 connected by a link 131 to a driving segment 132. This driving segment 132 cooperates with a differentially movable arm 140 carrying a latch 133 identical with the latch 133 for the amount banks, said latch being supported by an arm 134 and a lever 135.

When the cams 122 are rotated, the segments 132 through the link 131 and Y-shaped lever 124 raises the differentially movable arm 140 due to the engagement of the latch 133 with a shoulder on said driving segment until the outer end of the lever 135 comes into contact with whichever one of the keys 90 in this bank is depressed. When such contact occurs the latch 133 is disengaged from the shoulder and the forward end of said latch engages one of a plurality of notches 137 in a bar 138.

If no key in this bank is depressed, or if any one of the five lower keys is depressed, the zero stop pawl 88 associated therewith engages the end of an arm 141 pivoted on the hub 126. This arm 141 has a slot through which projects a pin carried by the lever 135 and therefore when the arm 141 is stopped by the zero stop pawl 88 the latch 133 is disconnected from the driving segments 132 and the differential mechanism stops in the zero position.

When one of the four top keys 90 is depressed, the zero stop pawl 88 is moved out of the path of the arm 141 in the usual manner and the differential mechanism caused to be set into a position corresponding to the key which is depressed.

When any one of the five lower keys 90 (Fig. 3) is depressed the differential mechanism, being stopped at zero, through means well known in machines of this type such as shown in the Shipley Patents 1,747,397 and 1,761,542 selects the minus side of the balance totalizer illustrated on the top totalizer line in Fig. 2. When any one of the four upper keys 90 is depressed, the plus side of the balance totalizer is selected for operation.

As before stated, these keys 90 are connected by bars 100 with the keys 101 in the second control bank.

The five lower bars 100 (Figs. 1 and 38) bear the following inscription: "Insur" for insurance, "Savi'gs" for savings, "Stock", "Disc" for discount, and "Allow" for allowances. Therefore when any one of these five bars is depressed those amounts are to be subtracted from the balance totalizer and consequently the differential mechanism associated with the first control bank or the keys 90 selects the minus or subtract side of the balance totalizer.

The four upper bars 100 are inscribed as follows: "Checks", "Earned", "Bonus", and "O. time". The four items represented by the four upper bars 100 are therefore to be added into the balance totalizer and consequently when the differential mechanism in Fig. 3 is set in any one of the four upper positions it selects the plus side of the balance totalizer.

*Second control row differential*

As previously stated, this differential is identical with that shown in Fig. 3, associated with the first control row, and is for the purpose of selecting the totalizer corresponding to the inscription on the bars 100 so that the various amounts which are entered into the plus and minus sides of the balance totalizer may be each kept separately in individual totalizers located on the rear totalizer line shown in Fig. 2.

*Third control row differential*

This differential is also identical with that shown in Fig. 3 and is used for the purpose of selecting the totalizers associated with the keys 110 and 112, the key 110 being inscribed "Total earned" and the key 112 being inscribed "Total deductions". Into the "Total earned" totalizer are accumulated all of the amounts entered into the machine through the depression of the four upper bars 100 and into the "Total deductions" totalizer is entered all of the amounts entered into the machine by the depression of the five lower bars 100, so that there is at all times a total in the machine of the total amount of money earned, including checks, the amount earned, bonuses, and overtime, and also there is a total of the amount of deductions, including insurance, savings, stock payments, discounts and allowances.

*Beam mechanism*

Appropriate to each amount differential mechanism and to each control bank differential mechanism is a beam 150, (Figs. 2 and 3) pivoted at one end to its differentially movable actuator 127 or arm 140 and bifurcated at its opposite end to straddle a roller 151 carried by a link 152. The beam 150 is adjusted by a roller 153 carried by the Y-shaped lever 124 in a well known manner. At their lower ends each of these links 152 is pivoted to an arm 154 fast to a spiral segment 155 loose on a shaft 156 supported by the machine side frame. These spiral segments 155 mesh with spiral gears 157 fast on the inner end of shaft 158, which, except the one associated with the first control bank, through mechanism to be later described, sets up type wheels for printing the amount and other data on the various record receiving means.

At their upper ends the links 152 are pivoted to segments 160 fast on nested sleeves 161 supported by a shaft 162. An aligning bar 163 carried by a plurality of arms 164 fast on a shaft 165 is adapted normally to engage teeth 166 formed on the segments 160. When the differential mechanism is operated the bar 163 will have been moved out of the teeth 166 and when the differential movement is completed they will be again moved into engagement therewith to properly align and hold the various mechanisms set up by the differential mechanism in their set positions. The means for operating the bar 163 is old and well known in the art and it is not, therefore, either shown or described herein.

*Totalizers*

The totalizers used in the present machine are old and well known in the art and therefore no detailed description of them will be given herein. If such a description is desired, reference may be had to the Shipley patents previously mentioned.

There are three lines of totalizers in the machine. The front totalizer line carries two totalizers, one associated with each of the two keys 110 and 112 in the third control bank. The back totalizer line consists of nine totalizers, one associated with each of the keys 101 of the second control bank. The top totalizer line carries one adding and subtracting or balance totalizer.

Each of the totalizers on the front and rear totalizer lines (Fig. 2) consists of a plurality of pinions 130, one pinion in each group of pinions. Therefore, if the first pinion of each group is engaged with the differential actuators 127 a certain totalizer will be actuated. If the second pinion in each group is engaged a different totalizer will be operated, etc.

The adding and subtracting totalizer on the upper totalizer line consists of two pinions 130, each having secured to the side thereof a beveled pinion 168. The beveled pinions face each other and mesh with a pair of bevel pinions 169 so that when one totalizer pinion 130 is in engagement with the actuating rack 128 the pinion which is not in engagement therewith is rotated in the opposite direction as is usual in totalizers of this type.

Totalizer selecting mechanism

Since the totalizer selecting mechanism in the present machine is identical with that shown and described in the above mentioned Shipley Patents Nos. 1,747,397 and 1,761,542, that mechanism has not been illustrated, it being thought sufficient to say at this time that the totalizers 130 (Fig. 2) on the back totalizer line are selected through the beam 150, link 151, segment 160 and appropriate sleeve 161 in a manner which is fully illustrated and described in the last mentioned Shipley patents.

These totalizers on this rear totalizer line are selected under control of the differential mechanism associated with the second control bank, which is in turn controlled by the keys 101 attached to the key bars 100.

The two totalizers on the front totalizer line are controlled by the differential mechanism associated with the third control bank and are selected in a manner well known in the art by the keys 110 and 112.

As has been previously stated, the plus and minus sides of the balance totalizer 130 on the upper totalizer line are selected under control of the keys 90 (Fig. 3). It will be recalled that the control detent 92 has notches 95 opposite the five lower keys, which are attached to the insurance, savings, stock, discount and allowance bars 100, which represent amounts paid out. Since the depression of any of these keys does not move the control detent 92 the zero stop pawl 88 associated with this bank is not moved out of the position shown in Fig. 3 and consequently the arm 141 contacts the same in the zero position and disconnects the latch 133 from the driver 132 to set the differential arm 140, beam 150, link 152, segment 160 and sleeve 161 associated with this bank in their zero positions, which through the mechanism fully illustrated and described in the last two mentioned Shipley patents selects the minus side of the add and subtract or balance totalizer 130.

When any one of the four upper keys 90, which are connected to the checks, earned, bonus and overtime bars 100, which represent amounts to be paid out or, in other words, to be entered into the plus side of the add and subtract totalizer, the detent 92 is shifted and rocks the zero stop pawl 88 out of its normal position whereby the driving segment 132 drives the differential arm 140 until the latch is disconnected therefrom by contact of the forward end of the lever 135 with its end of the depressed key. In this particular instance, no matter which of the four upper keys is depressed, the plus side of the add and subtract totalizer is selected for engagement with the differential rack 128 through the beam 150, link 152, segment 160 and sleeve 161 in a manner fully illustrated and described in the last two mentioned Shipley patents.

Totalizer engaging mechanism

No totalizer engaging mechanism is shown or described herein, as reference may be had to the previously mentioned Shipley patents if such illustrations and descriptions are desirable.

Printing mechanism

The printing mechanism is located in front of the machine proper. Referring now particularly to Figs. 1 and 34 to 37, the machine is equipped with a shelf 180 to receive a stack of check sheets 181 so that they will be handy for the operator when making up a payroll. The check sheets 181 are taken from the stack on the shelf 180 and placed on a table 182, one sheet at a time, with the edge 183 on a line 184 inscribed on the table 182. A knee lever 185 is provided for convenience of the operator in separating the feed rolls to be hereinafter described upon the insertion of the check sheets at the proper initial position. In case the operator does not wish to use the knee lever 185, a hand lever 186 is provided for the same purpose. After a sheet of checks is printed, they are slid from the table 182 into a receptacle 187 at the left of the machine. The table 182 is also provided with guides 188 to facilitate in the initial locating of the check sheets.

The usual date-setting knobs are indicated at 189, and 190 designates the hand knobs for setting the consecutive number when starting to write a certain series of checks.

When printing a voucher check 191, such as shown in Fig. 35, the bottom edge 192 is placed on the guide line 193 so that the first item printed will fall in the proper place.

Associated with the upper printing mechanism is a table 195 (Fig. 1) upon which the payroll sheet 196 (Fig. 34) is placed to receive the impressions making the payroll record. A guide line 197 aids the operator in properly locating the payroll sheet so that the first impression will fall in its proper place.

Figure 13:
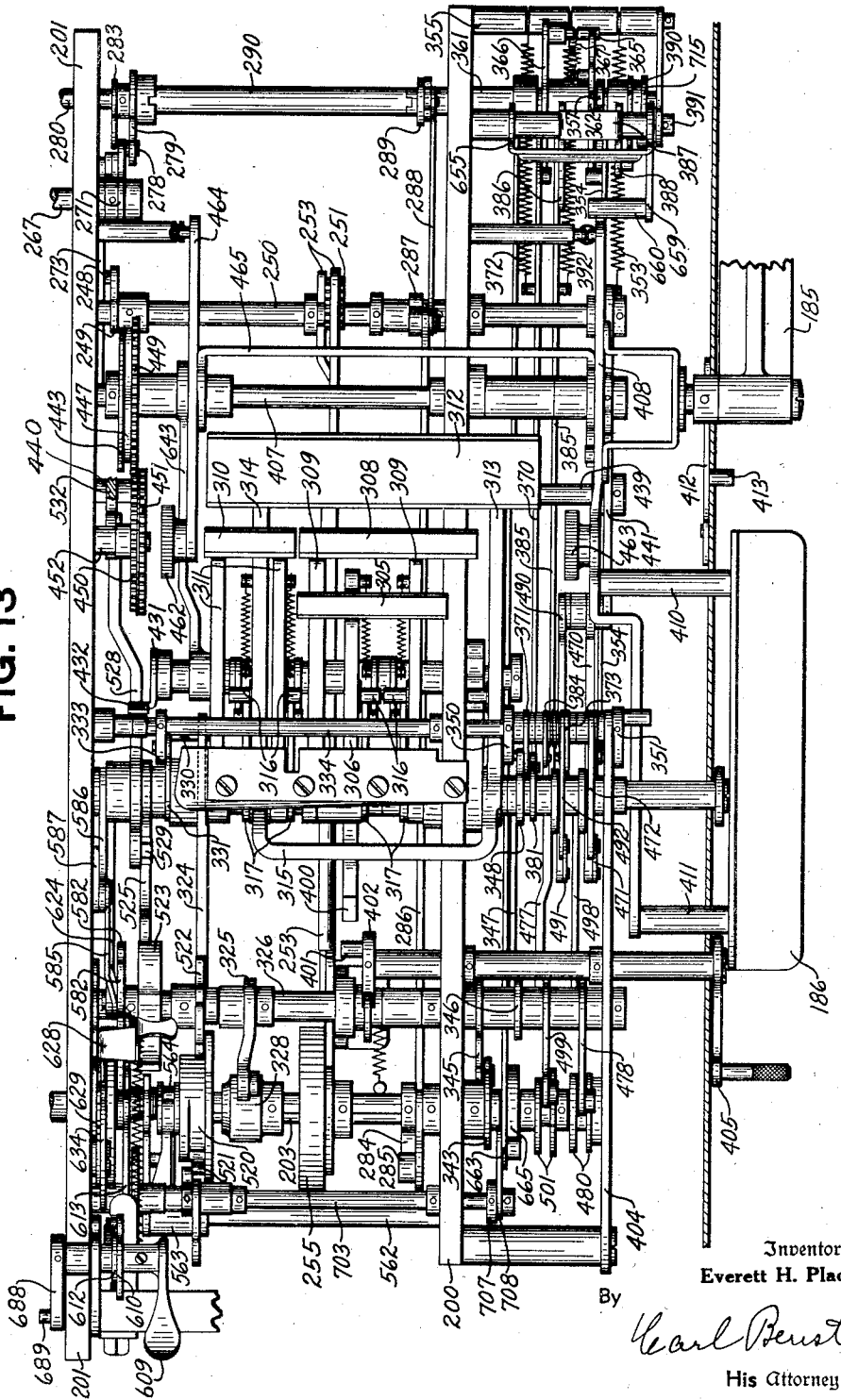
Fig. 13 is a plan view of the lower printing mechanism and also shows the hand feeding lever for the payroll sheet.

The frame work for the printing mechanism comprises a front frame 200, an intermediate frame 201 and a rear frame 202 (Figs. 9, 10 and 13).

The entire printing mechanism is driven by the main shaft 75, through connections identical with that shown and described in the above mention Shipley patents. These connections have not been shown or described herein. It is thought that it is sufficient to say here that the printing mechanism has a main cam shaft 203, which is connected with and disconnected from the main cam shaft 75 of the machine at the proper time to perform all of the functions to be hereinafter described in connection with the printing mechanism.

Racks

The several amount type wheels and data designating type wheels are set up from the various differential mechanisms of the machine by means of a system of racks.

It will be recalled that the spiral segment 155 (Fig. 2) drives a spiral pinion secured to a shaft 158. Also secured to this shaft 158 is a spur gear segment 210 which meshes with teeth on the underside of a rack 211, slidably mounted on rods 212 (see also Fig. 4). The upper edge of the rack 211 is also provided with teeth, which mesh with a gear 213 secured to one end of a sleeve 214, upon the other end of which is a gear 215 (Fig. 10) meshing with a type wheel 216 for the upper printer, which prints on the payroll sheet, and with a lower wheel 217 for the lower printer, which prints on the checks. The sleeves 214 are supported by shafts 218. As is fully illustrated and shown in the previously mentioned Shipley patents, it requires two shafts 218 and two sets of gears and sleeves 215 and 214 respectively in order to set up all the necessary type wheels. It is, however, thought that no further mention need be made of this intricate gearing as reference may be had to those patents for illustrations and detailed descriptions.

In the present machine there are two groups of amount type wheels so that the amounts may be printed underneath the items and also to the left, just above the signature. This is necessary, especially when using stub checks, as shown on the check sheet 181 of Fig. 36.

In order to set up this second set of amount type wheels the gears 215 mesh with a gearing device indicated by the character 219, which gearing device is identical with that illustrated and described in United States Patent No. 1,693,279 granted to Walter J. Kreider, November 27, 1928, and therefore no further illustration or description thereof is deemed necessary herein.

There is no rack 211 or type wheels associated with the differential mechanism for the first control bank illustrated in Fig. 3. There is, however, a rack and type wheels associated with the second control bank. Referring now particularly to Fig. 3, the back one of the two shafts 158 is the one driven from the differential mechanism associated with the second control bank and this shaft has secured thereto two segments 220 meshing with teeth on the underside of two racks 221 (Fig. 4) one of which sets up type wheels carrying inscriptions corresponding to those on the key bars 100, and the other controls the printing and feeding of the payroll sheet.

Date type wheels 222 (Fig. 10) are carried on a shaft 223 and are set through the medium of the date knobs 189 shown in Fig. 1. Consecutive or check number type wheels 224 (Fig. 23) are also mounted on the shaft 223. The consecutive number in this instance is the same as the check number and since the checks may run in different sets of serials, the manually settable knobs 190 (Fig. 1) are provided for setting up the consecutive or check number type wheels 224 at the beginning of the writing of any series of checks.

These knobs 190 are connected to the consecutive type wheels on the upper type line and through gearing to sleeves 225 (Fig. 23) which in turn are connected with gear 226 meshing with gears 227 which in turn mesh with the type wheels 224 so that said wheels can be set to any desired number at the beginning of the writing of a series of checks.

When a series of checks is being written by the machine, the consecutive or check number is automatically advanced one for each check that is written. This mechanism includes ratchet 228 secured to the gears 226 which have cooperating therewith a differentially tined pawl 229 of the usual type which is carried by a pair of arms 230. When the arms 230 are rocked clockwise, as viewed in Fig. 23, the differentially tined pawl advances the lowest order ratchet 228 and corresponding gear 226 one step to advance the check number type wheel 224 so that the check will have one number higher than the previous one.

The mechanism for rocking the pair of arms 230 to operate the check number type wheels 224 will be hereinafter described.

In addition to the type wheels above described, the machine is also provided with a block 231 (Fig. 10) carrying a signature electro plate. This signature block is adapted to be removed from the machine and a different one inserted therein in case it is necessary to write different types of checks upon the machine. So that unauthorized persons cannot operate the machine for writing checks, a lock 232 is provided in each block 231 to prevent removal of the blocks and insertion of other blocks by unauthorized persons.

*Consecutive or check number operating mechanism*

The means for driving the check number actuating arm 230 and the differentially tined pawl connected therewith will now be described.

Secured to the pair of actuating arms 230 (Fig. 23) is a partial gear 240 (Fig. 22) meshing with a segment 241 secured to a shaft 242 which also has fastened to it an arm 243. Connected to this arm 243 is a link 244 also pivoted to a bell crank 245 having connected thereto a pitman 246. The pitman 246 has a notch 247 adapted to cooperate with a pin 248 on an arm 249 secured to a shaft 250 which also has secured to it a segment 251. The segment 251 meshes with teeth 252 on a pitman 253 carrying a roller 254 cooperating with a box cam 255 secured to the printer drive shaft 203.

When the machine is at rest the pitman 246 is disconnected from the pin 248 as shown in Fig. 22, but upon depression of certain keys to release the machine in a manner to be hereinafter described, the right end of the pitman 246 is lowered and the notch 247 embraces the stud 248. With the parts in such position, the cam 255 through the train of mechanism just described, rocks the pair of consecutive number actuating arms 230 first clockwise (Fig. 23) to actuate the consecutive number to count one and then returns the arms 230 counter clockwise to their normal positions during each operation of the machine.

*Consecutive or check number controlling mechanism*

At certain times and particularly when itemized checks are being printed, it is necessary to maintain the consecutive number operating mechanism in a disabled position during the several operations in which the items are printed. For example, referring to Fig. 36, there are six items shown printed on the top check. During these six operations it is absolutely necessary that the consecutive number operating mechanism be maintained in its normal disabled position. But upon printing the total the consecutive number operating mechanism is enabled so as to count one whereby the proper consecutive number will be printed.

Considering now the second check shown in Fig. 36, where there are no items printed, this amount is printed upon the depression of the "check" bar 100. Therefore, when the machine is released for the operation by this bar the consecutive number operating mechanism must be enabled so that the proper consecutive number will be printed.

Therefore, to control the consecutive or check number operating mechanism from the bars 100, there is associated with the key pins 102 (Fig. 7) of the second control bank a curved bar 256 having notches 257. This bar 256 is carried by an arm 262 pivoted at 258.

Pivoted to the arm 262 is a link 259 having an elongated slot embracing a pin 260 in a yoke arm 261 pivoted on the shaft 156. A pin 268 carried by the differential hanger associated with the second control bank prevents the arm 262 and bar 256 from falling any lower than that shown in Fig. 7.

The yoke arm 261 carries a pin 265 (Figs. 5 and 7) engaged by the bifurcated end of an arm 266 secured to a shaft 267 mounted in the printer frames 201 and 202. Secured to the shaft 267 are arms 270 and 271 connected by a pin 272 upon which is pivoted a pitman 273 (Fig. 22). The left end of the pitman 273 is bifurcated to embrace a guide stud 274 carried by the frame 201. This stud 274 also normally projects into the vertical portion of an L-shaped latch 275 in the consecutive number pitman 246. The pitman 273 also carries a pin 276, normally projecting into the lower portion of a cam slot 277, also in the pitman 246.

Referring again to Figs. 5 and 7, the arm 271 carries a pin 278 projecting into the bifurcated end of an arm 279 pivoted on a shaft 280 supported by the frames 200, 201 and 202. A spring 281 connected to the arms 270 normally tends to rock the arms 270, 271 and shaft 267 counter clockwise, as viewed in Fig. 5, but is prevented from doing so by means which will be hereinafter described.

The pitman 273 also carries a roller 282 adapted to cooperate with a partial disk 283 secured to the shaft 280. The cooperative relation between these two parts will be hereinafter explained.

As previously stated, the spring 281 (Fig. 5) is normally tending to rock the arms 270 and 271 counter clockwise to draw the pitman 273 toward the right (Fig. 22). Such movement, however, is normally prevented by means of a cam 284 (Fig. 8) secured to the printer shaft 203. This cam 284 in its normal position cooperates with a roller 285 carried by a pitman 286 which is connected to an arm 287 loose on the shaft 250, which in turn is connected by a link 288 to an arm 289 connected by a sleeve 290 to the arm 279 (Figs. 5, 7 and 13).

Immediately after the beginning of an operation of the machine, upon the counter clockwise movement of the cam shaft 203, the cam 284 releases the pitman 286 which can be moved toward the right (Fig. 8) under the influence of the spring 281. This causes the arm 271 to be rocked counter clockwise, thus drawing the pitman 273 toward the right (Fig. 22) whereupon the pin 276 by its cooperation with the cam slot 277 lowers the right end of the pitman 246, thus causing its slot 247 to embrace the stud 248 in the driving arm 249, so that upon movement of the pitman 253 the consecutive number operating mechanism drives the consecutive number actuating arm 230 and pawl 229.

At the end of the operation the cam 284 restores the pitman 286, arms 279 and 289, sleeve 290 and arm 271 to their normal positions, thus shifting the pitman 273 back to the position shown in Fig. 22, which disconnects the pitman 246 from the driving arm 249.

As previously stated, when any one of the item key bars 100, which are used to release the machine when entering items, is operated, it is absolutely essential that the consecutive or check number operating device be maintained in its normal disabled position. This is done by holding the arms 270 and 271 against any action by the spring 281.

This is accomplished in the following manner: By referring to Fig. 7 it will be noticed that each of the lower eight pins 102 on their respective keys cooperates with one of the notches 257 in the bar 256. Consequently, when any one of these lower eight key bars 100 is depressed the bar 256 and arm 262 are rocked clockwise, thus raising the link 259 and bringing the lower end of the elongated hole in contact with the pin 260 in the yoke arm 261. Thus, it can be seen that when the yoke arm 261 is held, due to the fact that it is connected directly to the arm 266 on the shaft 267 upon which shaft are secured the arms 270 and 271, the spring 281 cannot rock said arms 270 and 271, and consequently the pitman 273 will be maintained in the position shown, whereby it holds the pitman 246 (Fig. 22) with its notch 247 wholly disengaged from pin 248 on the driving arm 249 and consequently the consecutive or check number operating mechanism will not be operated during an operation of the machine when any one of the item key bars 100 is depressed.

After the printing of the several items on the checks, such as shown on the top one in Fig. 36, the operator moves the total lever 115 (Figs. 7 and 38) to the first position below add, which is marked in Fig. 38 "Clear total checks". When the total lever is in this position the add and subtract or balance totalizer which has accumulated all of the sums of the various items printed on the checks, is cleared so that the total of those items, or in other words the amount to be paid by the check can be printed beneath the items and also when a stub check is used on the main portion of the check.

It is during this operation that the consecutive number mechanism should operate, so that the proper check number will be printed adjacent the date, as shown just to the left of the column of items in Fig. 36.

During this "Clear total check" operation of course the bar 256 and arm 262 are not moved, and therefore, there is room in the bottom of the slot in the lower end of the link 259 for the pin 260 to move, and consequently if nothing else prevents the arms 270 and 271 from moving, then as soon as they are released by the cam 284, the spring 281 will rock said arms counter clockwise and draw the pitman 273 to the right, as previously explained, to couple the pitman 246 with the driving arm 249.

When the total lever is moved into its "Clear total check" position it does not in any way interfere with the movement of the arms 270 and 271 under the influence of the spring 281, as will be clearly seen by the following description:

Connected to the total lever plate 116 is the usual link 300 (Fig. 7) which in turn is pivoted to an arm 301 secured to a spiral segment 302 which meshes with a spiral pinion 303 secured to the shaft 280 to which it will also be remembered is secured the partial disk 283.

This partial disk 283 is in the path of the roller 282 on the pitman 273 and has a notch 304 which is directly opposite the rollers 282 when the total lever 115 is in its add position. This is to allow the pitman 273 to move to the right under certain conditions when the total lever is in its adding position, as will be hereinafter described. This notch or recess 304 is rather wide and when the total lever 115 is moved to its first position below add, it will through the link 300 and arm 301, spiral segment 302 and spiral pinion 303, turn the shaft 280 counter clockwise, thus rocking the disk 283 likewise. When the disk 283 is in such position the notch 304 is still in front of the roller 282 and consequently the pitman 273 may be shifted to the right to couple the pitman 246 with the driving arm 249 when the total lever is moved into its "Clear total check" position.

At this point it might be well to state that when the total lever is moved into its second and third positions below add (indicated in Fig. 38), the disk 283 is moved a corresponding distance, but opposite those positions of the disk there are no notches and consequently the true periphery of the partial disk 283 is then moved into a position directly in front of the roller 282 so that the pitman 273 cannot be moved to the right and consequently the consecutive or check number mechanism cannot be operated when the total lever is in its second and third positions below add, which are the positions into which it is moved to clear the totals from the second and third control rows.

Likewise when the total lever is moved into any of its three positions above its add position the disk 283 is at that time moved in a clockwise direction but as there are no notches opposite any one of the three corresponding positions in the disk 283 the true periphery thereof is opposite the roller 282 and thus prevents any operation of the consecutive or check number mechanism during the taking of subtotals when the total lever is in any one of the three upper positions.

When printing a check from which there are to be no deductions or additions, such as the second one illustrated in Fig. 36, then it is necessary that the consecutive or check number print during the one and only operation which is necessary to print such a check. When such a check is to be printed, the top one of the key bars 100 bearing the insignia "Check" is depressed to release the machine for operation.

The key stem 101 associated with this bar 100 does not have any pin 102 cooperating with the bar 256 (Fig. 7) and consequently said bar and arm 262 and the link 259 are not moved upon depression of this key whereby the spring 281 may function to rock the arms 270 and 271 and draw the pitman 273 to the right to couple the pitman 246 with the driving arm 249 after the cam 284 (Fig. 8) has released the arms 279 and 289.

There is still one other condition under which the consecutive or check number must be printed upon the one and only operation necessary to print a check, and that is when the "No check" bar 111 is operated to release the machine to print ciphers on a pay check of one of the employees who perhaps did not work for the week when these checks are being run, but nevertheless his name and number were pre-printed on a check sheet along with other names who did work.

Therefore, when such a condition arises the operator releases the machine by the depression of the "No check" bar 111, which causes the machine to go through its regular operation and a check will be printed like the second one shown in Fig. 36, except instead of having an amount $35.25 printed in two places, there will be all zeros printed, showing that the man has no pay coming to him.

Since none of the key bars 100 were depressed during this operation and due to the fact that the "No check" key bar 111 does not have any control over the bar 256, the arms 270 and 271 (Fig. 5) are free to move under the influence of the spring 281 upon the release of those arms by the cam 284 shown in Fig. 8 and consequently the pitman 246 in Fig. 22 is coupled with the driving arm 249 by the movement of the pitman 273 toward the right.

*Check hammer mechanism*

To print the date, check number, item, two totals, signature, the word "Paymaster" and the word "Division" with a 3 beneath it requires four hammers. These hammers are shown in Figs. 11, 13, 18, 20, and 21. A hammer 305 carried by an arm 306 mounted on a rod 307 cooperates with the date type wheels 222 and consecutive or check number type wheels 224 to print the date and check number. A hammer 308 carried by a pair of arms 309 mounted on the rod 307 cooperates with the amount type wheels 217 to print the amount shown just below the check number in Fig. 36. A hammer 310 carried by a pair of arms 311 mounted on the rod 307 cooperates with another group of type carriers 217 to print the items listed at the top check of Fig. 36 and also to print the total of those items which appears just below the column.

A hammer 312 carried by arms 313 and 314 connected by a yoke 315 pivoted on the rod 307 cooperates with the electro plate 231 to print the signature, the word beneath the signature, the word to the right and the figure below that word, as shown on the two checks in Figs. 36 and 37. This hammer is also adapted to print two signatures with words beneath them, as shown in Fig. 35, whenever the occasion demands, as it will be remembered that this electro plate 231 is removable from the machine.

By referring to Figs. 11, 18, 20 and 21 it can be seen that secured to one arm of each pair of hammer arms 309 and 311, and to each arm 314 and 306, is a pin 316 cooperating with a cocking lever 317 loosely mounted on the rod 307. Connected to each cocking lever 317 is a heavy hammer operating spring 318 which normally holds the hammers in the positions shown in Fig. 11.

The upper ends of the cocking levers 317 are normally held in contact with a bail 319 carried by arms 320 and 321 (Figs. 11 and 12) pivoted on the rod 307. The arm 320 carries a stud 322 projecting through a slot 323 of a link 324 pivoted to a bell crank 325 loosely mounted on a shaft 326 supported by the printer frames 200 and 201. The slot 323 has vertical and angular sections and the pins 322 normally stand in the position shown in Fig. 12 at the junction of the two sections of the slot. The bell crank 325 carries a roller 327 cooperating with a hammer operating cam 328 secured to the printer operating shaft 203.

The link 324 has a slot 329 into which projects a pin 330 carried by an arm 331 loose on the rod 307. This arm 331 also carries a pin 332 projecting into the bifurcated end of an arm 333 secured to a shaft 334 supported by the printer frames 200 and 201.

With the parts in the positions shown in Fig 12, when the bell crank 325 is rocked clockwise by the cam 328 the link 324 is drawn toward the left and the angular portion of the slot 323 rides idly over the stud 322 and consequently there is no movement of the arm 320 and bail 319. Therefore, the cocking levers 317 for the hammers are not moved and they will not operate when the link 324 is maintained in the position shown in Fig. 12.

However, by means to be hereinafter described, the shaft 334 is upon certain operations rocked in a counter clockwise direction thereby rocking the arm 331 clockwise whereby its pin 330 rocks the link 324 about its lefthand pivot and causes the vertical portion of the slot 323 to engage the stud 322. With the stud 322 thus engaged by the vertical portion of the slot 323 the movement of the cam 328 rocks the bail 319 and its arm 320 clockwise about the rod 307, whereupon the cocking levers 317 are rocked in a clockwise direction, thus stretching the hammer operating spring 318, so that when the high portion of the cam 328 leaves the bell crank 325 and roller 327 the springs 318 become effective to drive the hammers 305, 308, 310 and 312 against their respective types to make impressions from those types.

*Hammer control*

As previously stated, when printing the type of check shown in Fig. 36, wherein it is necessary to print several items, during the printing of those items only the hammer 310 is operated, the other three hammers 305, 308 and 312 being held normally in a disabled position, that is, they are normally prevented from following the cocking levers 317 when they are cocked to stretch the springs 318.

Whenever any printing is done from the lower printing mechanism the hammer 310 will always work. Also, as previously stated, whenever the total amount of an itemized check is printed, then the consecutive number and date hammer 305 operates, the amount hammer 308 operates to print the amount beneath the consecutive or check number, and the item hammer 310 operates to print the amount at the foot of the column of the items. Also, the hammer 312 operates to print the signature and other data in connection therewith.

Means for normally holding the three hammers 305, 308 and 312 (Figs 11, 18, 20 and 21) normally ineffective, or in other words so they will not be cocked when the cocking levers 317 are operated, comprises three blocking arms 340, one associated with each of the respective hammers, which arms are secured to a shaft 341 carried by the printer frames. These arms 340 normally lie just beneath and contact the pins 316 of the hammers 305, 308 and 312. When these blocking arms 340 are moved from beneath the pins by means to be hereinafter described, then those hammers will be allowed to follow the respective cocking levers 317 so that they may be operated by their springs 318 when the cocking levers are released by the cam 328.

It might be well to state at this point that the usual rebound preventing arms 342 (Fig. 11) are associated with the hammers to prevent them from rebounding and striking the type a second time, which usually causes a smudge of the print. This mechanism will not be further described, as reference may be had to the previously mentioned Shipley patents for a description thereof.

When the total lever 115 is in the "add" position and any one of the lower eight key bars 100 (Fig. 7) is depressed to cause the machine to either add or subtract an amount represented by those keys to or from the balance totalizer, then only the item hammer 310 is operated which prints the amount set up on the keyboard in connection with the key 100 which has been depressed.

During such operations the blocking arms 340 remain in the positions shown in Figs. 18, 20 and 21, thus preventing the hammers 308, 305 and 312 from being cocked so they will not be thrown against the type.

During these operations it is, however, necessary that the link 324 (Fig 12) be rocked so that the vertical portion of its slot 323 engages the stud 322 to cause the cocking levers 317 to be operated at this time. Since there is no blocking arm 340 associated with the item hammer 310, this hammer will be cocked to print the several items. As previously stated, it requires a counter clockwise movement of the shaft 334 to rock the link 324 to the position just above mentioned.

The means for rocking this shaft 334 during the operations of the machine in which the several items illustrated in Fig. 36 are printed will now be described.

There is secured to the printer shaft 203 (Figs. 13 and 17) a cam 343 cooperating with a roller 344 and an arm 345 connected to an arm 346, both of which are pivoted on the shaft 326. Connecting the arm 346 to a bell crank 348 is a link 347. The bell crank 348 is pivoted on the rod 307 and carries a stud 349 projecting into a slot in an arm 350 secured to the shaft 334. Also secured to the shaft 334 is an arm 351. These two arms 350 and 351 are connected by a rod 352 which extends between the two arms and through the arm 351. The cam 343 normally holds the parts just described in the positions shown in Fig. 17. Shortly after the beginning of the operation of the machine the cam 343 is rocked clockwise out of the path of the roller 344 whereupon the arms 350 and 351 and shaft 334 are rocked counter clockwise by a spring 353 (Figs. 13 and 14) connected to a pitman 354 and to a stud 355 secured to the printer frame 200. The right end of the pitman 354 is adapted to slide in a groove of a hub 356 of a partial disk 357 secured to the previously described shaft 280. The left end of the pitman 354 is pivoted to an arm 358 loose on the shaft 334 and bearing against the rod 352.

The spring 353 normally tends to pull the pitman 354 toward the right but is prevented from doing so by the cam 343 (Fig. 17) which normally holds the parts in Fig. 17 in the position shown therein, wherein the rod 352 is contacting the arm 358. However, when the cam 343 releases the roller 344, then the spring 353 draws the pitman 354 toward the right as the rod 352 is at this time free to move.

The disk 357 being secured to the shaft 280 is adapted to be moved by the total lever 115 because it will be remembered from the previous description how the mechanism shown in Fig. 7 rocks this shaft 280 upon movement of the total lever 115.

However, during the operations in which the items shown in Fig. 36 are printed at the top of the check in that figure the total lever 115 is in the "add" position. To permit the movement of the pitman 354 to the right at this time the partial disk 357 has a slot 359 into which a stud 360 on the pitman 354 is adapted to enter when the pitman 354 is moved by the spring 353 upon release of the rod 352.

When the total lever is moved to the first position below "add", which is the "Clear total check" position, in which position the machine operates to take the total of the items from the balance totalizer so that the total amount of the check which is payable may be printed, the disk 357 is moved one step in a counter clockwise direction, thus placing the true periphery of the disk in front of the stud 360, and in this position the pitman 354 cannot be moved by the spring 353.

For this reason other means are provided to rock the shaft 334 during the printing of the total of the items. It will also be recalled that during the printing of such total it is necessary to print the date, the consecutive or check number and the signature and other data associated with the signature. Therefore, all three of the hammers 305, 308 and 312 in addition to the item hammer 310 must be released and allowed to drop when their cocking levers 317 are cocked by the cam 328.

During this operation none of the key bars 100 is depressed and therefore the link 259 (Fig. 7) is not moved; hence accordingly the pin 260 can be moved downwardly when the cam 284 releases the pitman 286 (Fig. 8) which rocks the arms 289 and 279 which are sleeved together. Such rocking of the arms it will be recalled is effected under the influence of the spring 281.

Connected to the arm 289 (Fig. 13) by a sleeve 361 is a lever 362 having an arm 363 (Fig. 14) and a finger 364. The finger 364 is held by a spring 367 in contact with a pin 365 carried on a lever 366 pivoted on the sleeve 361.

The arm 363 (Fig. 14) is normally out of the path of the stud 360 on the pitman 354, and therefore, does not interfere with any movement toward the right of that pitman by its spring 353. An arm 368 of the lever 366 is normally in the path of a pin 369 on a pitman 370 (Fig. 15) one end of which is slidably mounted on the sleeve 361 the other end being pivoted to a lever 371 (Fig. 20) loose on the shaft 334. This pitman 370 is adapted to be moved to the right by a spring 372 when the rod 352 and arm 368 are moved out of the path of an arm 373 and the studs 369 respectively. The arm 371 (Figs. 15 and 20) contacts the pin 374 carried by the arm 373 which arm, it will be remembered contacts the rod 352.

From the above description it can be seen that when the total lever 115 is moved to its "Clear total check" position, which is the first position below the "add" position that the disk 357 will be rocked counter clockwise, thus blocking any movement of the pitman 354 by placing the true periphery of said disk in the path of the stud 360. At the same time, since the stud 260 (Fig. 7) is free to move under the influence of the spring 281 (Fig. 5) the arm 289 and consequently the lever 362 are rocked in a clockwise direction by that spring 281 whereupon the finger 364 of the lever 362 rocks the lever 366 clockwise, thus removing its arm 368 from in front of the stud 369 on the pitman 370. Therefore, when the cam 343 (Fig. 17) releases the roller 344 the spring 372 (Fig. 15) will draw the pitman 370 to the right, thus rocking the rod 352 and shaft 334 counter clockwise, which rocking it will be recalled lowers the link 324 (Fig. 12) so that the vertical portion of its slot 323 engages the stud 322, whereby, when the cocking levers 317 are cocked by the cam 328 the hammers will be allowed to follow the levers and be operated by the springs 318 when the bell crank 325 is released by the cam 328.

The movement of the pitman 370 by its spring 372 also removes all three of the blocking arms 340 shown in Figs. 18, 20 and 21, from beneath the pins 316 associated with the hammers 308, 305 and 312. The connections for causing such rocking are clearly shown in Fig. 20 and comprise a stud 380 carried by the arm 371 engaged by a lever 381 connected by a link 382 to an arm 383 which is secured to the shaft 341 to which are also secured the blocking arms 340. As the pitman 370 moves to the right the blocking arms 340 through the linkage just described are rocked clockwise from beneath the pins 316 to render the hammers 308, 305 and 312 effective.

At the end of the operation the cam 343 of course restores the mechanism shown in Fig. 17 to its normal position whereby the rod 352 restores the pitman 370 and blocking arms 340 to their normal positions.

At the end of this operation of the machine when the total lever 115 is moved back to its "add" position the disk 357 is restored to the position shown in Fig. 14, thus placing the slot 359 again in cooperation with the stud 360. Just before the end of this operation the cam 384 (Fig. 8) restores the arm 289 and consequently the lever 362 to their normal positions, whereupon the spring 367 causes the pin 365 to follow the nose 364 and restore the lever 366 to the position shown in Fig. 15 where its arm 368 again blocks the pitman 370. When the shaft 334 is rocked clockwise to its normal position by the cam 343 the link 324 (Fig. 12) is raised to the position shown, thus leaving all the hammers in a normally disabled condition.

When printing checks having only one amount, such as those shown, as the bottom ones illustrated in Figs. 36 and 37, then it is necessary for all four of the hammers 305, 308, 310 and 312 to operate during that operation. During such operations the total lever 115 is left in the "add" position and the top one of the key bars 100 having the designation "Check" is depressed to release the machine.

During such an operation the arm 262 and link 259 (Fig. 7) are not moved, due to the fact that the key stem 101 associated with this check bar 100 has no pin 102 cooperating with the bar 256. Therefore the stud 260 is free to be moved downwardly under the influence of the spring 281 when the cam 284 releases the pitman 286 in the manner previously described. Therefore, the lever 362 will be rocked clockwise, placing its arm 363 in front of the stud 360 of the pitman 354 thus blocking any movement of this pitman under the influence of its spring 353. Since the total lever 115 is not moved, the disk 357 remains in the position shown, but as just stated, the pitman 354 is nevertheless blocked by the arm 363 of the lever 362. At the same time the lever 366 is rocked clockwise by the lever 362 thus releasing the pitman 370 to the action of its spring 372 whereby the shaft 334 is rocked to lower the link 324 (Fig. 12) to render the hammer cocking mechanism fully effective and at the same time the lever 381, link 382 and arm 383 (Fig. 20) rocks the blocking arms 340 from beneath the pins 316 of the hammers 308, 305 and 312. Consequently all four hammers will be operated to print the consecutive number or check number, the date, the amount for which the check is drawn, the signature and other data associated with that signature.

By referring to Fig. 35 it will be noticed that after the printing of the several items on the voucher portion of a voucher check such as illustrated in this figure, the amount on the balance totalizer is printed on the voucher portion of the check as well as upon the main portion of the check. In order to print this total twice it is necessary that the first print which takes place on the voucher portion of the check be made a sub-total or reading operation so that the amount which is printed from the balance totalizer will be put back in that totalizer again, ready to control the printing mechanism to print the total on the main portion of the check.

During the printing of this sub-total, which in the present instance, in Fig. 35 is represented by the figures $262.35, there is still another means which will now be described for controlling the four hammers so that only the item hammer 310 will be active during the printing of this sub-total when the total lever is out of its adding position. It will be recalled that when the total lever is out of its adding position when printing checks, such as shown in Figs. 36 and 37, all four hammers are rendered effective to print, but as only a sub-total is to be printed on the voucher portion of the check, it is highly desirable to render the check number, the date, the one amount hammer and the signature, hammers ineffective, to prevent any printing on the voucher by those hammers.

When the total lever 115 is moved to its first position above add, which is the "Sub-total check" position, it will through the mechanism shown in Fig. 7 rock the shaft 280 in a clockwise direction. When this occurs the disk 283 is rocked clockwise and moves the true periphery of the lower portion thereof in front of the roller 282 on the previously described consecutive number pitman 273, thus preventing any movement of the arms 270 and 271 by the spring 281. Therefore, if the spring 281 cannot function to rock the arms 270 and 271, then the arms 279 and 289 and consequently the lever 362 cannot be moved during such an operation. Since the lever 362 cannot be moved, the lever 366 will remain in the position shown in Fig. 14 thereby blocking the pitman 370 against any action by its spring 372. The movement of the total lever 115 to its sub-total position rocks the disk 357 in a clockwise direction, thus placing the true periphery of the lower portion thereof in the path of the stud 360 on the pitman 354, thus blocking any movement of that pitman by its spring 353.

Since both the pitmans 354 and 370 are blocked during sub-total operations, there must be some means for rocking the shaft 334 to lower the link 324 so that the item hammer 310 can be effective to print the sub-total on the voucher portion of the check. This mechanism is shown in Figs. 13 and 16. An arm 384 is loosely pivoted on the shaft 334 and is recessed like the arm 371 to surround and contact the pin 374 in the previously described arm 373. Pivoted to this arm 384 is a link 385, the right end of which is pivoted to an arm 386 connected by a bail 387 to an arm 388 carrying a pin 389 cooperating with a disk 390 secured to the shaft 280. The arms 386 and 388 are pivoted on a stud 391 carried by the printer frame 200. A spring 392 normally tends to draw the link 385 toward the right but is prevented from doing so on the previously described operation, due to the fact that the pin 389 is blocked by the disk 390. Since this disk 390 is secured to the shaft 280 it will of course be moved by the total lever when it is moved to its first position above add to print the sub-total on the voucher check (Fig. 35) now under consideration. When the disk 390 is so moved it places a recess 393 thereof in the path of the pin 389 and consequently the spring 392 will draw the link 385 toward the right when the cam 343 (Fig. 17) frees the stud 344 and the rod 352. Therefore, during said sub-total operation the shaft 334 is rocked by the spring 392 to lower the link 324 into coupling position to render the cocking levers effective so that the item hammer 310 can be operated to print the sub-total shown on the voucher portion of the check in Fig. 35. Due to the fact that the pitman 370 is blocked during this operation the arm 371 (Fig. 20) is not moved and consequently the blocking arms 340 are maintained beneath the pins 316 of the hammers 308, 305 and 312 thus rendering them ineffective during this sub-total operation.

During other total-taking operations or sub-total taking operations when the total lever 115 is moved either into its second or third positions below the "add" position or above the "add" position the disks 357, 283 and 390 prevent movement of the pitmans 354, 370 and the link 385. Consequently the shaft 334 cannot be rocked, and therefore, the levers 317 will not be operated when the cam 328 rocks the bell crank 325 and the link 324 will simply be moved to the left (Fig. 12) idly, the stud 322 entering the angular portion of the slot 323.

*Manual control of lower printer hammers*

At times it may be desirable to prevent the printing of the check or consecutive number without disabling the amount hammer 308 and signature hammer 312.

For this purpose the hammer arm 306 has a rearwardly projecting arm 400 (Figs. 13 and 20) adapted to cooperate with a stud 401 carried by an arm 402 secured to the shaft 403 supported by the printer frame 200 and a plate 404. Also secured to the shaft 403 is a manually operable arm 405. The arm 402 and pin 401 are adapted to be held in their normal positions shown in Fig. 20 by a spring-drawn aligner or retainer 406. When it is desirable to disable the consecutive number and date hammer 305, the operator rocks the manually movable arm 405 counter clockwise, thus moving the stud 401 in front of the arm 400. The arms 402 and 405 are held in their moved positions by the retainer 406 cooperating with a recess 399 in the arm 402. Therefore, notwithstanding the fact that the blocking arm 340 may be moved from beneath the pin 316 the hammer 305 still remains disabled when the stud 401 is in front of the arm 400.

There is also provided a manually operable mechanism for disabling the signature hammer 312 whenever desirable. This mechanism is shown in Fig. 21. Connected together and mounted on the rod 307 are arms 415 and 416, the latter carrying a pin 417 cooperating with an arm 418 loose on the shaft 341. This arm 418 has a hook 419 adapted to engage the stud 316 of the signature hammer 312 when the arms 415 and 416 are rocked in a clockwise direction, thus preventing the signature hammer from operating, notwithstanding the fact that its blocking arm 340 has been removed from beneath the pin 316.

The machine is also provided with other means for preventing any movement of any one of the four hammers on the lower printing mechanism under certain conditions. Those conditions are, when the knee lever 185 (Fig. 1) is rocked counter clockwise by the operator preparatory to placing a sheet of checks in the machine or when the hand lever 186 (Fig. 1) is rocked counter clockwise by the operator for the same purpose, all four of the lower printing hammers are prevented from movement during that time, due to the fact that the rod 352 is prevented from moving toward the right (Figs. 14, 15 and 16), upon release of said rod by the cams 343, so that even though any of the springs 353, 372 or 392 may be ready to operate their respective pitmans or link they cannot function, due to the fact that the rod 352 is absolutely prevented from movement by the movement of either the knee lever 185 or hand lever 186. The mounting of these levers and the control over the rods 352 will now be described.

Pivoted on a shaft 407 (Figs. 10 and 25) supported by the printer frames 200 and 201 is a long lever 408 to which is connected the knee lever 185 and the hand lever 186. Counter clockwise movement of either the knee lever 185 or the hand lever 186 rocks the lever 408 counter clockwise about the shaft 407 thus bringing a projection 409 thereon directly in the path of movement of the rod 352 and positively locking all of the four hammers associated with the lower printing mechanism while the lever 408 is in such moved position. The hand lever 186 is secured to the lever 408 by long studs 410 and 411.

It may be desirable at times to temporarily lock the four hammers against movement without the necessity of the operator holding either the lever 185 or the lever 186 and for this purpose the machine is provided with a slide 412 (Fig. 13) having a pin 413 projecting through the cabinet of the machine to facilitate movement of the slide 412 from right to left. When it is desirable to lock the lower hammers, the slide 412 is moved toward the left after the depression of the lever 186 or the knee lever 185. Movement of the slide 412 (Fig. 39) to the left causes its left end to be moved above the stud 410 thus maintaining the lever 186 and consequently the lever 408 in their moved positions thus the projection 409 blocks movement of the rod 352 and control shaft 334.

Ribbon mechanism

Associated with the type wheels and hammers is the usual ribbon 420 (Fig. 22). No means is shown or described herein for feeding or reversing the ribbon mechanism, but any of the well known forms may be used for this purpose.

The ribbon mechanism is supported by a removable frame 421 as is usual in machines of this type.

To prevent the ribbon from blurring or smudging the checks as they are fed and printed, there is provided what is known in the art as a blur shield 422 (Figs. 22 and 24). This shield is pivoted to bails 423 and 424 supported on a stud 233 (Fig. 10) and a stud 425 supported by the printer frame 201 respectively. The blur shield 422 and bails 423 and 424 are held in their normal positions as shown in Fig. 22 by pilot screws 426 which extend through the frame 421 and pilot into the bails 423 and 424.

When it is necessary to remove the ribbon 420 and its frame 421 for any reason, first, a screw 434 (Fig. 1) is removed, then the pilots of the two screws 426 (Figs. 1, 22 and 24) are unscrewed from the bails 423 and 424 whereupon the bail 423 rocks clockwise and the bail 424 rocks counter clockwise, thus lowering the blur shield 422 and moving it out of the way of the ribbon 420. Now the frame 421 may be withdrawn carrying with it the ribbon 420 and its usual supporting spools.

The blur shield 422 has three openings 427, 428 and 429, the opening 427 being for the hammer 312, the opening 428 being for the hammers 308 and 310, and the opening 429 for the hammer 305.

It will be recalled that in printing checks, such as shown as the top one in Fig. 36 when the items are printed, only the hammer 310 is operated. Due to the fact that hammers 310 and 308 are so close together it is necessary to make the opening 428 one continuous opening for both hammers. Therefore, when the hammer 310 alone is operated it has a tendency to buckle the check sheet whereby the raised portion sometimes would strike on the first type wheel which is adapted to cooperate with the hammer 308, thus causing a part of the letter S (Fig. 36) of the abbreviation "CTS" to appear in front of the item designation. To prevent any such printing as this, there is attached to the blur shield a spring-operated finger 430 which normally stands in the position shown in Fig. 24, so that the paper or check sheet cannot possibly contact the type wheel having the characters "CTS".

Of course, when all four of the hammers are operated, then it is necessary to rock the finger 430 so that it will clear the opening 428 and to accomplish this there is secured to the shaft 341, which it will be remembered has secured to it the hammer blocking arms 340, an arm 431 having a finger 432 adapted to cooperate with a flange 433 of the finger 430. When the shaft 341 is rocked clockwise (Fig. 22) to remove the hammer blocking arms 340 from beneath their respective hammers, the finger 432 contacts the flange 433 and rocks the finger 430 so that its end does not overlie the opening 428 and consequently the hammer 308 is allowed to make its usual impression.

Check sheet feeding mechanism

When either of the check sheets 181, shown in Figs. 36 and 37, or a voucher check 191, shown in Fig. 35, is placed in the machine with its respective edges 183 and 192 on the guide lines 184 and 193, a space indicated by an arrow, and marked 435 in Figs. 35, 36 and 37 lies immediately above the item hammer 310.

The feeding mechanism for the check sheets is so arranged that before any printing takes place and whenever any one of the eight lower key bars 100 is depressed, the check sheet will receive a short feed, thus placing that portion of the check in position to receive the first item impression shown as "Earned $55.55" in Fig. 36 and "Earned $20.65" in Fig. 37

Then before each of the successive items is printed, the check sheet receives another short feed to place it in position to receive that impression it being understood that it requires one operation to print each of the items shown.

After the several items are printed the feeding mechanism is operated to feed the check sheet so that it will be in position to have printed thereon the date and consecutive or check number from the hammer 305, the total amount from the hammers 308 and 310 and the signature and other data from the hammer 312. This last mentioned feed may be variable as there may be only two or three items instead of six, and consequently the feeding mechanism must operate to bring the check in position to have the totals printed always in the same place regardless of how many items have been previously printed.

After the printing of the total the check sheet receives another longer feed to bring the next check into a position whereby the space designated as 435 on that check will be opposite the item hammer 310.

Assuming that the next check is not to be itemized, then as previously stated, the "Check" bar 100 is depressed, which controls the feeding mechanism so that the short item feed will not be operated but rather a long feed will be effective which will feed the check from the position indicated at 435 to the "Total" position indicated in Fig. 36 by the total amount of the single check $35.25.

In printing a voucher check, as previously stated, the check is placed so that the space marked "435" (Fig. 35) is opposite the hammer 310. The check is then given a short feed to place it in position to receive the amount $265.00, and then on the next operation another short feed will place it in position to receive the amount "$2.65". After this impression the check is given a feed to bring it into position to receive the balance $262.35 which appears on the voucher portion of this check. This, as previously stated, is a sub-total operation. After the sub-total is printed and during that same operation the check is fed from the sub-total printing position into the position indicated by the arrow 437. On the next operation the total lever is moved to the first position below "add" and during this operation the check is fed from the position indicated at 437 to the position where the total $262.35 is printed on the main body of the check. During this operation and after the printing of the total the check is fed out of the machine.

From the above general description it can be seen that the check sheet feeding mechanism is very flexible, and is controlled by the keys 100, and by the position of the total lever during sub-total and total printing operations.

The check feeding mechanism will now be described in detail.

The feeding mechanism is shown in Figs. 10, 13, 14, 15 and 19. Slidably mounted on a stud 439 supported by the printer frame 200 and the shaft 250 is a rack 441 meshing with a segment 442 secured to the shaft 407. Also secured to the shaft 407 is an arm 443 carrying a spring-pressed feeding pawl 444 normally held by a spring 445 in engagement with a large tooth 446 of a ratchet 447 pivoted on the shaft 407. The tail of the pawl 444 is also normally in engagement with a stud 440 (Figs. 13 and 14) in the frame 201 and in axial alignment with the stud 439, which stud 440 acts as a stop for the pawl and arm to prevent overthrow or excessive feed during the short feeding operations. Adjacent the large tooth 446 is a series of smaller teeth 448. There are three sets of teeth 446 and 448 on the ratchet 447.

The ratchet 447 is secured to a gear 449 (Figs. 13 and 14) which meshes with a gear 450 in turn secured to a gear 451. The gears 450 and 451 are carried by a stud 452 mounted in the printer frame 201. The gear 451 meshes with a pinion 453 mounted on the stud which carries the type wheels 217 associated with the lower printing mechanism. Secured to the pinion 453 is a knurled feeding roller 455. Also loose on the type wheel stud is another knurled feeding roller 456. The ratio of the gears 449, 450, 451 and pinion 453, is such that a one-tooth movement of the ratchet 447 by the pawl 444 drives the feeding roller 455 the exact amount for a short feed operation so that the items as shown in Fig. 36 will all be spaced exactly the same distance apart. This is very important when printing on checks that are formed in check sheets having, for example, five checks to the sheets. If the feed were not held accurate, by the time the last check was to be printed, the printing might fall below the check and therefore make it invalid.

To insure that both the feeding rollers 455 and 456 operate exactly the same, these rollers have secured to them respectively pinions 457 and 458 which mesh with pinions 459 and 460 secured to a shaft 461 supported by the printer frame.

Cooperating with the feeding rollers 455 and 456 is a pair of flexibly mounted feeding rollers 462 and 463 respectively. The roller 462 is carried by a lever 464 pivoted on the shaft 407 and is connected by a bail 465 to the previously described lever 408 which carries the feeding roller 463. Springs 466 normally maintain the rollers 462 and 463 in engagement with the rollers 455 and 456 when no check sheet is in the machine, said rollers 462 and 463 of course engaging the check sheet when one is placed between the two pairs of feeding rollers.

To positively prevent any retrograde movement of the feeding rollers 455 and 456 there is secured to the roller 455 a finely knurled disk 467 having cooperating therewith a spring-pressed pawl 468 pivoted on the shaft 461.

From the above description it will be clear that to feed the check sheet its "short-feed" the arm 443 (Figs. 14 and 15) is rocked counter clockwise until the pawl 444 engages the next adjacent small tooth 448 after which the arm 443 is rocked clockwise to its normal position, thus carrying the ratchet 447 and gear 449 a distance of one tooth space 448. This movement of the gear 449 is transmitted to the gears 450, 451, and pinions 453 to the feeding rollers 455 and 456.

It has been previously stated, but it may again be stated here that to insert a check sheet in the machine the rollers 462 and 463 must be lowered, and this is accomplished by rocking the knee lever 185 or the hand lever 186, both of which are secured to the lever 408. This of course rocks the roller 463 away from the roller 456 and the bail connection 465 rocks the lever 464 to disengage the roller 462 from the roller 455.

The rocking of the arm 443 above described is caused by a reciprocation of the rack 441, which is accomplished in the following manner:

Referring particularly to Fig. 14, it can be seen that there is a link 470 pivoted to the left end of the rack 441, which link is connected by another link 471 to an arm 472 pivoted on the shaft 334. This arm 472 carries a pin 473 normally resting on a shoulder of the previously described arm 358, which it will be remembered is held in its normal position by the rod 352.

As the parts are shown in Fig. 14, they are in their normal positions, wherein a notch 474 of the link 470 is normally disengaged from a pin 475 carried by an arm 476 loose on the rod 307. Pivoted to the arm 476 is a link 477 connected to a cam lever 478 on the shaft 326. The cam lever 478 carries a pair of rollers 479 cooperating with a pair of double plate cams 480 secured to the printer drive shaft 203.

These cams 480 are so timed as to rock the arm 476 first counter clockwise and then clockwise to normal position before it is time for the hammer 310 to make its impression, thus shifting the check sheet from the blank space indicated at 435 in Fig. 36 to a position to receive the impression "Earned $55.55" by the hammer 310. This back and forth movement of the arm 476 is communicated through the link 470, when the latter is connected to the pin 475 by means to be hereinafter described, to the rack 441 to rock the arm 443 and pawl 444 in the manner previously described, to drive the check feeding rollers.

It will be recalled that a short feed operation takes place only when one of the lower eight key bars 100 (Fig. 7) is depressed and that during such an operation, due to the mechanisms previously described, the pitman 354 (Fig. 14) is permitted to move toward the right by the spring 353, after the rod 352 is free to be moved.

As soon as the arm 358 and rod 352 rock counter clockwise under the influence of the spring 353, upon movement of the pitman 354, the link 470 will rock counter clockwise about its right-hand pivot connection and cause its notch 474 to engage the pin 475 on the drive arm 476. If for any reason the link 470 should so fail to rock when the arm 358 is moved counter clockwise, said arm is provided with a finger 481 which will contact the pin 473 and positively rock the arm 472 to lower the link 470 and connect it to the pin 475.

When the link 470 is so connected to the arm 476 which is caused by the depression of any one of the lower eight key bars 100 the movement of the pair of cams 480 is as above described transmitted to the pawl 444 to feed the ratchet 447 one tooth space.

This feed will continue so long as items are printed on the check. In the example shown there are six items printed After the sixth item it will be recalled that the total lever 115 is moved into its first position below add which is its "Clear total check" position. At the end of the printing of the sixth item, which in the illustrated case is "Stock $6.00" the ratchet 447 will be standing in such a position that the tooth space marked 482 in Fig. 14 will be engaged by the pawl 444 when the pawl is in its normal position shown in Figs. 14 and 15.

If there had been only three items such as shown in Fig. 37 then the ratchet 447 would be standing in a position whereby the pawl 444 would be engaging the third tooth space to the left of that marked 482. After the printing of the last item, whether it be one, two or six, the total lever 115 is moved into its first position below add to control the machine to print the total amount of the items from the balance totalizer. During the first part of the printing operation of such total-taking operation of the machine the check sheet is fed from whichever one of the last item printing positions the check sheet may have stopped at, to the total printing position to receive the printing of the total of such items.

From the previous description in connection with the hammer mechanism it will be recalled that when the total lever is moved into its "Clear total check" position the pitman 354 is blocked from movement by the partial disk 357 being moved in front of the stud 360. Therefore, the short feeding mechanism will be rendered ineffective because the link 470 will not be permitted to engage the pin 475. During this operation, however, the pair of cam plates 480 will be driven with the printer shaft 203 but the arm 476 will simply move idly back and forth.

Due to the fact that the short feed mechanism is disabled at this time means are provided for giving the arm 443 a longer movement to bring the sheet positively and accurately to the total printing position. During this total printing operation it will be recalled, as previously described, that while the pitman 354 is blocked out by the disk 357 the pitman 370 (Fig. 15) is released to the action of its spring 372 since the arm 368 is moved away from the pitman stud 369.

Connected to the rack 441 is a link 490 which in turn is connected by a link 491 to an arm 492 loosely pivoted on the shaft 334. This arm 492 carries a pin 493 normally resting against a shoulder on the arm 373. During the short feeding operation previously described the contact between the pin 493 and arm 373 is maintained by a torsion spring 494 which is wrapped around the shaft 334 and connected to the arms 384 and 492, as shown in Fig. 15. This spring is absolutely necessary because during the short feed operation it will be recalled that the rod 352 is moved to the right and if it were not for this spring 494 the weight of the links 490 and 491 would lower the arm 492 and rock the link 490 which would engage its notch 495 with a pin 496 on an arm 497 loose on the rod 307. This arm 497 is connected by a link 498 to a cam lever 499 carrying a pair of rollers 500 cooperating with a pair of cam disks 501. These disks are secured to the printer drive shaft 203 and rotate once for each operation of that shaft.

From the above description it can be seen that when the pitman 370 is moved to the right under the influence of its spring 372 that the arm 371 (Fig. 20) will through its contact with the pin 374 rock the arm 373 counter clockwise whereupon the arm 492 will be rocked likewise and the link 490 lowered to cause its notch 495 to engage the pin 496 on the arm 497. If the arm 492 does not follow the arm 374 a finger 502 on the arm 373 contacts the pin 493 and positively lowers the link 490 to make the above connection to the pin 496.

The pair of cams 501 are so timed that before the printing of the total takes place the portion 503 of the cam rocks the lever 499 and consequently the arm 497 counterclockwise, thus moving the rack 441 to the right a distance sufficient to cause the arm 443 to carry the pawl 444 its greatest distance toward the right, which distance is sufficient to cause it to pass by all of the small teeth 448 of any one section of teeth which happens to be cooperating with the pawl at that time. After the pawl has been thus moved, a section 504 of the cams 501 rocks the lever 499 and arm 497 clockwise to normal position thus drawing the rack 441 toward the left and the arm 443 and pawl 444 are returned to their normal positions thus rotating the ratchet the proper distance to cause the feeding rollers 455 and 456 to feed the check sheets into position to receive the total print. In other words, when this long feed takes place, which may vary from a distance equal that between the "Stock $6.00", amount, and the "Amount $55.00" shown on the top check of Fig. 36 and a distance between such total amount and the first item, which in this case is "Earned $55.55", the pawl 444 always engages to the right of the last one of the small teeth 448 in the series of teeth with which it is cooperating.

After the total print has taken place a portion 509 of one of the pair of the cams 501 again rocks the arm 497 counter clockwise to move the rack 441 to the right a second time, thus moving the pawl 444 so that it will engage the large tooth 446 of the next adjacent righthand set of teeth on the ratchet 447. After this engagement has been effected by the pawl 444 a portion 505 of one of the cams 501 restores the rack 441 to its normal position whereby the pawl rotates the ratchet 447 to the position shown in Fig. 14, which is its normal position with the pawl engaging behind one of the large teeth 446. During this operation the gearing between the ratchets and the feeding rollers 455 and 456 causes them to feed the check sheets from the total position indicated by the print of $55.00 in Fig. 36 to the blank position on the subsequent check, indicated by the arrowed reference character 436.

Each of the links 477 and 498 is connected to its respective cam lever 478 and 499 by adjustable means shown in Figs. 14 and 15 so that a very fine adjustment of the movement of the rack 441 may be obtained.

Assuming now that the check sheet is in a position whereby the blank space indicated at 436 in Figs. 36 and 37 is opposite the hammers 310 and 308, and that the check now to be written is one which does not have any items to be printed thereon but only a single amount. In this instance it will be recalled that the top one of the key bars 100 bearing the insignia "Check" is depressed to release the machine. It will also be remembered that during the operations of the machine when such key bar is depressed, that due to the fact that the stud 260 in Fig. 7 is free to move, the spring 281 may rock the arms 270 and 271, which in turn rocks the arms 279 and 289 whereby the latter through its sleeve connection rocks the lever 362 (Figs. 14 and 15). It will also be recalled that the rocking of this lever places its arm 363 in the path of the stud 360 of the pitman 354 thus blocking any movement of this pitman and at the same time removes the arm 368 from the stud 369 on the pitman 370 thus freeing this pitman to the action of its spring 372 when the rod 352 is free to move.

With the parts in these positions it can be seen that the portion of the cam 504 at the proper time will cause the ratchet 447 to be given its greatest movement to feed the check from the blank position 436 in Figs. 36 and 37 to the position upon which is printed the amount $35.35 in Fig. 36 and $7.11 in Fig. 37. After this total printing has taken place the portion 505 of the cam again feeds the check sheet from these last mentioned total positions to the blank position indicated either as 435 or 436 on the subsequent check of the sheet being printed upon.

The feeding mechanism for printing voucher checks illustrated in Fig. 35 will now be described. The feed from the blank position indicated at 435 to the first item position is accomplished in identically the same manner as that described in connection with the itemized check shown in Fig. 36. The feed to the second item is also accomplished in the same manner, that is, through the pitman 354 shown in Fig. 14. The next operation, that is, the printing of the sub-total indicated as $262.35 on the voucher portion of the check requires one of the variable long feeds. However, since during this operation the total lever 115 has been moved upwardly to its sub-total position which is in this case the first position above add, the pitman 354 is blocked by movement of the disk 357 and the pitman 370 is blocked indirectly by movement of the disk 283 (Fig. 5) which it will be recalled moves in the path of the roller 282, which is on a pitman 273 pivoted on the arm 271 and consequently this arm 271 cannot be rocked by the spring 281 when the total lever is in its sub-total position. Therefore, neither of the arms 279 or 289 can be rocked and consequently the lever 362 remains in the position shown whereby the arm 368 remains in front of the stud 369 thus blocking the pitman 370.

The movement of the total lever, however, to its sub-total position does rock the disk 390 previously described, in a clockwise direction one step, thus freeing the link 385 (Fig. 16) to the action of its spring 392, whereby the arm 373 is rocked counter clockwise thus causing the arm 492 to be lowered, whereby the link 490 causes its notch 495 to engage the pin 496 so that the long feed cams 501 when operating during this sub-total operation will cause the pawl 444 to operate the ratchet 447 to feed the voucher check from the position indicated as "Dis. $2.65" to the sub-total printing position "$262.35" before the printing of that sub-total.

After the printing of that sub-total the long feed again operates in the manner previously described, to feed the voucher check from the sub-total printing position to the position indicated as 437 in Fig. 35, after which and during the next operation wherein the total lever is moved to the first position below add, which is a total position, the long feed again operates in the same manner as described in connection with the check shown in Fig. 36 whereby the cam 501 feeds the check from the position 437 to the total position indicated where the print $262.35 is shown. After the printing of this total on the main portion of the voucher check, the long feed cams again operate the ratchet 447 to feed the voucher checks out of the machine.

To prevent any overthrow or additional feed of the check sheets when the long feed mechanism is operating there is provided a stop pawl 506 (Figs. 14 and 15), held in contact with the ratchet by a spring 507. During a long feed operation the stop pawl 506 under the action of the spring 507 engages the portion of the ratchet 447 between the series of teeth 448 and since the ratchet on a long feed always ends up in identically the same place the side of the large tooth 446 will contact the end of the pawl 506 and positively prevent any excessive movement of this ratchet and consequently of the feeding rollers 455 and 456.

Since this pawl 506 is held by a spring 507 always in contact with either the small teeth 448 or the space between the teeth, the arm 443 has integral therewith an arm 508, which arm upon the long feed engages the pawl 506 and restores it to its normal position, holding it there until the small teeth 448 are again moved beneath it.

It will be recalled that whenever the check receives short feeding movements it always receives a long feed for its last movement relative to that check. Also when checks are printed wherein no short feed takes place, the last feed given relative to that particular check is a long one and consequently the pawl 506 will always be restored to the position shown in Fig. 14 at the end of every check-printing operation, whether it be a check of the types illustrated in Figs. 36 and 37 or a voucher check illustrated in Fig. 35.

Upper hammer

The hammer mechanism associated with the upper line of type carriers for printing upon the payroll sheet 196 (Fig. 34) is particularly illustrated in Figs. 10 and 33, and will now be described.

Pivoted on a rod 515 carried by the frame 201 and a plate 516 supported by studs 517 also carried by the frame 201 is a yoke 518 carrying a hammer 519, which is of sufficient width to print the check number and amount shown in Fig. 34.

To operate this hammer 519 there is slidably keyed to the printer drive shaft 203 a flanged disk 520 carrying a pin 521 cooperating with a Geneva wheel 522 secured to the previously described shaft 326. This Geneva wheel 522 is a five-pointed one and secured to the shaft 326 is a five-pointed cam 523 cooperating with a roller 524 carried by a lever 525 pivoted on the rod 307. A strong operating spring 526 maintains contact of the roller 524 or a point 527 of the lever 525 with the cam 523. Also pivoted on the rod 307 is a lever 528 having a stud 529 held in contact with the lever 525 by a spring 530. Connecting the lever 528 with an arm 531 secured to the hammer yoke 518 is a link 532.

From the above description and by referring to Fig. 33 it can be seen that the upper hammer 519 is normally in a cocked position. The shaft 203 as will be recalled receives one rotation for each adding operation of the machine, which turns the Geneva wheel 522 and cam 523 one-fifth of a turn. As shown, at approximately 190 degrees, the pin 521 picks up the Geneva wheel 522 and rotates it clockwise. Shortly after this wheel 522 starts to turn the lobe of the cam 523 passes the point 527 of the lever 525 whereupon the spring 526 moves the lever 525 clockwise until the point 527 thereof contacts the lowest portion of the cam 523. This movement of the lever 525 rocks the lever 528 likewise and through the link 532 and arm 531 brings the hammer 519 in contact with a printing medium which has previously been inserted in the machine on the table 195.

If a payroll is being made up then a payroll sheet such as shown in Fig. 34 is placed on the table 195 with the upper edge thereof on the guide line 197 which positions the top one of the printing spaces opposite the hammer 519.

By the time the pin 521 is ready to leave the notch in the Geneva wheel another adjacent lobe of the cam 523 has rocked the lever 525 counter clockwise to the position shown in Fig. 33, thus cocking the hammer and leaving it in the position shown in this figure.

Upper hammer control

When printing an itemized check such as the top one shown in Fig. 36 it is essential that the upper hammer be disabled during the printing of those items but enabled to print the total on the payroll sheet when the total is printed on the check. This control mechanism will now be described.

It will be remembered that the rack 221 (Fig. 4) is controlled by the differential mechanism associated with the second control bank of keys 101. This rack 221 has a tail 540 with low surfaces 541 and high surfaces 542 cooperating with a bail 543 carried by arms 544 and 545 (Fig. 9) pivoted on a rod 546 supported by the printer frames 201 and 202. The arm 544 has a finger 547 cooperating with a projection 548 of an arm 549 pivoted on a stud 550 carried by an arm 551 pivoted at 552 to the frame 58. Also pivoted to the stud 550 is a pitman 553 carrying a roller 554 cooperating with a cam 555 in the drive gear 72 which is secured to the drive shaft 75. Pivoted at 556 on the end of the frame 201 is a latch 557 carrying a pin 558 normally held in contact with a horizontal surface of the arm 549 by a spring 559. A spring 560 normally tends to rock the arm 549 counter clockwise. The latch 557 cooperates with a pin 561 in a slidable shaft 562 supported by the printer frames 200 and 201. Also secured to the shaft 562 is a shifting fork 563 engaging an annular groove 564 (Fig. 13) in the hub of the previously described disk 520.

There is also adapted to cooperate with the bail 543 the tail of a rack 566 (Fig. 4), which rack is adapted to be set by the total lever 115 in a manner substantially identical with that shown for the setting of the rack 221. The tail of this rack 566 is provided with a low surface 567 in a position which corresponds to the add position of the total lever, so that when the lever is in its add position the bail 543 will be free to cooperate with its low surface 567 providing the low surface 541 of the rack 221 is opposite said bail. In all other positions of the total lever the bail 543 cooperates with one or the other of the high surfaces 568 (indicated in Fig. 4).

During the item entering operations it is highly desirable to disable the printing mechanism so that the upper hammer 519 will not function, thus preventing the printing of the items on the payroll sheet 196.

The low surface 541 on the rack 221 which is set by the differential mechanism controlled by the second control bank is of such an extent that whenever any one of the lower eight key bars 100 is depressed the differential mechanism will position this rack 221 so that the corresponding low surface 541 will be opposite the bail 543.

Since the total lever is in its add position during all operations when items are printed on the checks, the low surface 567 of the rack 566 will also be cooperating with the bail 543.

For each rotation of the main drive shaft 75 the pitman 553 (Fig. 9) is reciprocated back and forth, carrying with it the arm 549. The first movement of the pitman is toward the left, and as it moves in that direction a notch 569 in the arm 549 will be brought opposite the pin 561. Since at this time both low surfaces 541 and 567 cooperate with the bail 543, the finger 547 of the arm 544 permits the spring 560 to rock the arm 549 counter clockwise to engage the notch 569 with the pin 561 when the pitman reaches its lefthand position. Now as the pitman 553 is restored to its righthand or normal position shown in Fig. 9 the shaft 562 will be shifted toward the right in Fig. 9 and toward the front in Fig. 13, thus moving the cam 520 a distance sufficient to move the pin 521 out of the path of the Geneva wheel 522. Therefore, during the rotation of the printer drive shaft 203, with the cam 520 in that position the pin 521 will have no affect on the Geneva wheel and consequently the upper hammer 519 will not be actuated.

At the end of that operation of the machine the shaft 552, shifting fork 563 and cam disk 520 will be left in the positions to which they have been just shifted.

Assuming that the operation just described was the operation which printed the last item of "Stock $6.00" on a check such as that shown in Fig. 36, then of course the next operation of the machine is a total printing operation to print the total of the items there listed and for this purpose, as previously described, the total lever is moved to its first position below add. When it is moved in that position it will shift the rack 566 (Fig. 4) so as to position one of its high surfaces 568 opposite the bail 543, thus rocking the arm 544 counter clockwise to the position shown in Fig. 4, whereupon the finger 547 will maintain the arm 549 in position whereby its notch 569 cannot possibly engage the pin 561. It is to be understood that during the first part of this operation the arm 549 will, as it is being moved toward the left as viewed in Fig. 9 by the pitman 553, restore the shaft 562 and shifting fork 563 to the position shown in this figure and also in Figure 13 whereby the pin 521 is brought in the path of the Geneva wheel 522. However, as the pitman 553 is moved to the right, to its normal position, due to the fact that the finger 547 moves the arm 549 down the shaft 562 and shifting fork 563 will remain in the position shown whereby the Geneva wheel will be rotated one-fifth of a turn by the pin 521 during the rotation of the printer drive shaft 203 to operate the upper hammer 519 to cause the impression of the total which in this case is $55.00, and also the impression of the consecutive or check number, which in this case is 107, 110, as shown on the top line in Fig. 34.

When a check having only a single amount with no items is printed then it will be recalled that the top one of the key bars 100, which indicates a single check is depressed to release the machine. When this key is operated it controls the differential mechanism to shift the rack 221 (Fig. 4) so as to bring the high surface 542 of that rack beneath the bail 543 thus rocking the finger 547 of the arm 544 downwardly in position to contact the projection 548 of the arm 549 and moving the latter clockwise thus rendering said arm ineffective so that it will not shift the shaft 562 or shifting fork 563 from the position shown in Figs. 9 and 13 and therefore the upper hammer 519 will be operated to print upon the payroll sheet the amount of the check which in this case is $35.25 and also the consecutive or check number 107,111.

When the "No check" bar 111 is operated to release the machine to print ciphers on a check for an employee who has no pay coming, it is also desirable to print ciphers on the payroll sheet opposite such employee's name.

Since no key bars 100 are depressed the zero stop pawl 88 (Fig. 3) for the second control bank causes the associated differential mechanism to stop at the zero position and consequently the rack 221 (Fig. 4) remains in the zero position shown, wherein a high surface 542 cooperates with the bail 543 thus holding the finger 547 of the arm 544 down in contact with the projection 548 of the arm 549 thus rendering said arm ineffective, so that it will not shift the shaft 562 from the positions shown in Figs. 9 and 13, and therefore the upper hammer 519 will be operated to print the ciphers on the payroll sheet.

When printing voucher checks similar to that shown in Fig. 35 when the sub-total is printed on the voucher portion of the check in the manner previously described it is desirable that the upper hammer 519 be disabled during such operation so that the sub-total will not be printed on the slip (not shown) being used for record purposes in connection with the upper printer at this time. As no key is depressed in the second control bank at this time, the differential will stop at zero and consequently a high surface 542 on the rack 221 is opposite the bail 543, thus holding the finger 547 of the arm 544 down in contact with the projection 548 of the arm 549 thus rendering said arm ineffective which would permit operation of the upper hammer. Therefore, means is provided to disable the upper hammer during "sub-total check" operations.

Figure 4:
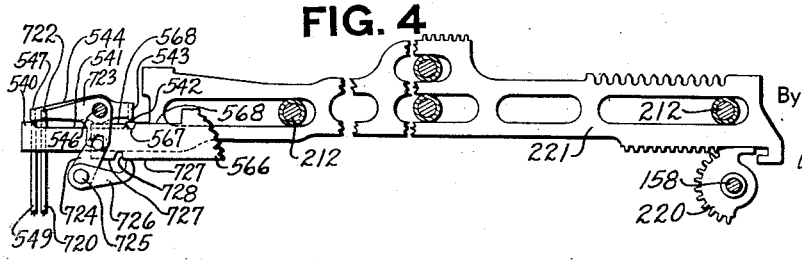
Fig. 4 is a detail of the type wheel rack associated with the second control bank.

Pivoted on the stud 550 (Fig. 9) is an arm 720 substantially like the arm 549, see also Fig. 4, having a projection 721 adapted to cooperate with a finger 722 of a bell crank 723 pivoted on the stud 546. Connected to the bell crank 723 is an arm 724 secured to a shaft 725 mounted in the frames 201 and 202. Also fastened to the shaft 725 is a finger 726 cooperating with high and low surfaces 727 and 728 respectively on the lower edge of the total lever rack 566. The low surface 728 corresponds to the first position above "add" or the "sub-total check" position of the total lever 115 and the high surfaces 727 correspond with all other positions of the total lever.

As can be seen in Fig. 4 the finger 726 is held down in all positions of the total lever except the "sub-total check" position and therefore the finger 722 has held the arm 720 down so that it did not have any effect on the shaft 562 during the previously described operations when the pitman 553 was reciprocated.

When the total lever 115 is moved to the "sub-total check" position, the lower surface 728 is brought opposite the finger 726 permitting a spring (not shown but identical with the spring 560) will, when the pitman 553 reaches its left-hand position, rock the arm 720 counter clockwise and its notch, like the notch 569, will engage the pin 561. Therefore, when the pitman 553 is restored to the right the arm 720 will shift the shaft 562 to the right in Fig. 9 which shifts the roller 521 out of the path of the Geneva wheel 522 to disable the upper hammer.

In the other two sub-total and total positions of the total lever, which are positions into which the total lever is moved for taking sub-totals or totals of the totalizers associated with the second control row and those associated with the third control row, there are high surfaces 568 on the top and 727 on the bottom edges of the total lever rack 566 and consequently the arms 549 and 720 are held in their lowered positions, so that they cannot shift the shaft 562 and consequently the upper hammer 519 will be operated to print totals or sub-totals from the several totalizers in the machine on the slip from the upper set of type wheels.

*Upper slip or sheet feeding mechanism*

The mechanism for feeding the payroll sheet or other type of slip which may be used with the upper printer is shown particularly in Figs. 10 and 28 to 32. Referring now to Figs. 28 and 31 there is secured to the printer drive shaft 203 a cam 580 cooperating with a roller 581 carried by a lever 582 pivoted on the shaft 326. This lever 582 has a slot 583 into which projects a pin 584 on a link 585 pivoted to a supporting arm 586 mounted on the rod 307. Connected to the arm 586 is a reciprocating rack 587 meshing with a pinion 588 secured to a disk 589 loose on a shaft 590 supported by the printer frame 201 and plate 516. The disk 589 carries two spring-drawn fine-tooth pawls 591 cooperating with fine teeth on the inner side of a circular flange integral with a disk 592 which is clutched to the hub of a feeding roller 593 secured to the shaft 590. Secured to the same shaft 590 near its outer or front end is another knurled feeding roller 594.

The mechanism described this far operates as follows: The cam 580 during its rotation rocks the lever 582 clockwise which through the link 585 and arm 586, moves the rack 587 to the right thus rotating the pinion 588 and disk 589 clockwise, which of course carries the pawls 591 with it. Upon the return movement of the rack 587 under the influence of the cam 580 the pawls 591 which at this time are being moved in a counter clockwise direction with the disk 589 drive the disk 592 and feeding rollers 593 and 594 counter clockwise, as viewed in Fig. 29, to feed the sheet toward the right, this sheet being placed upon the table 195 upside down with its top edge in line with the gauge mark 197 (Fig. 1).

To prevent the disk 592 from rotating clockwise, as viewed in Fig. 29, when the disk 589 and pawls 591 are moved in that direction, there are provided two retaining pawls 595 which cooperate with the knurled outer face of the flanges of the disk 592. These pawls 595 are carried by a plate 596 supported by the frame 201.

Cooperating with the two feed rollers 593 and 594 is a pair of knurled rollers 597 and 598 respectively, carried by spring-pressed levers 599 and 600 mounted on a stud 601 supported by the frame 201 and the printer front plate (not shown).

The above feed rollers are normally held in contact with each other by their spring levers 599 and 600, as shown in Fig. 30, and to place a payroll sheet or other form of slip between them on the table 195 it is necessary to rock the levers 599 and 600 clockwise, which is accomplished by a lever 602 (Figs. 1, 10 and 25) secured to a bail 603 pivoted on a stud 604 supported by the printer frame 201 and printer front plate. This bail 603 has two arms carrying studs 605 (Fig. 25) and 606 (Fig. 10) which cooperate with the levers 599 and 600 respectively.

By rocking the finger lever 602 counter clockwise the studs 605 and 606 rock the levers 599 and 600 thus disengaging the rollers 597 and 598 from the rollers 593 and 594, thus permitting the insertion of a payroll sheet or other slip upon which it is desired to print from the upper printer.

The machine is also provided with means for feeding the sheets by hand whenever desirable. Carried by a bracket 607 (Figs. 9 and 25) and the printer frame 201 is a shaft 608 having secured thereto a lever 609 to which shaft is also secured an arm 610 (Fig. 28). A spring 611 holds the lever 609 and arm 610 in the position shown in Fig. 28. Depression of the lever 609 causes the arm 610 after it takes up a clearance shown in Fig. 28 to engage an arm 612 connected by a link 613 to the upper end of the lever 582 and rock said arm 612 in a counter clockwise direction thus rocking the lever 582 clockwise to operate the feeding mechanism through the medium of the rack 587. The counter clockwise movement of the lever 609 rocks the disk 589 and pawls 591 clockwise and the return movement of the lever 609 in a clockwise direction to its normal position under influence of a spring 614 causes the pawls 591 to operate the feeding rollers 593 and 594 in the manner previously described.

There is an adjusting mechanism associated with the lever 582 so that the length of feed of th payroll sheet or other slip used in connection with the upper printer may be varied. As the mechanism is shown set in Figs. 28 and 32 it will feed the payroll sheet so as to print in the line spaces shown in Fig. 34. This adjusting mechanism will now be described.

Pivoted on the shaft 203 adjacent the frame 201 is an arm 620 having a curved rack 621 meshing with a pinion 622 secured to a gear 623 which in turn meshes with a curved rack 624. The rack 624 supports the stud 584. A guide bar 625 is provided to keep the rack from sliding laterally out of mesh with the gear 623 and a pin 626 carried by the arm 582 is provided to keep the rack 624 from axial disengagement from the gear 623. Mounted on studs 627 carried by the arm 620 is an adjusting slide 628 having a nose cooperating with notches in the top edge of a plate 629 secured to the frame 201 by a screw 630. A spring 631 normally maintains the cooperation between the nose of the slide 628 and the notch of the plate 629. The plate 629 is kept from rocking by a stud 632 carried by the arm 620 which stud runs in a slot 633 of the plate 629 when the arm 620 is adjusted to change the length of feed of the slip or payroll sheet 196.

From the above description it can be seen that when the slide 628 is manually raised the arm 620 may be moved counter clockwise, whereupon the rack 621 rotates the pinion 622 and gear 623 thus shifting the rack 624 and raising the pivot stud 584 of the link 585 in the slot 583 thereby changing the leverage between said pivot stud 584 and the shaft 326 upon which the feed arm 582 is pivoted. The farther up in the slot 583 the stud 584 is moved the greater will be the movement of the link 585, arm 586 and rack 587 and consequently the greater the feed given to the payroll sheet.

The plate 629 is provided with five notches in its upper edge, for the purpose of locking the feed arm 620 in any one of five positions, so that it may have five different lengths of feed. However, the number of notches may be varied according to the necessities of the case.

While there are five notches shown, it may be that it would be desirable in certain instances to use only three of them or perhaps only two of them, and for this reason there is provided an adjustable stop plate 634 held by the screw 630 and carrying a roller 635 projecting into a slot 636 in the plate 629. This stop slide 634 has a high lug 637 to prevent any movement of the nose of the slide 628 past the same, and consequently if this stop slide 634 is shifted to the right after having loosened the screw 630 for this purpose, it may be locked in any of its adjustable positions by again tightening up the screw 630 and thus limiting the length of feed which may be given to the upper slip by adjustment of the arm 620.

*Upper slip feed disabling mechanism*

As previously stated and particularly when using a payroll sheet, it is desirable not to print on the payroll sheet any of the items which are shown printed on the checks illustrated in Fig. 36 and therefore it will be recalled that the upper hammer 519 during the printing of these items is disabled and enabled at the time when the total of those items is printed. It is also enabled for the printing of a single amount check such as shown in the bottom of Fig. 36.

Since that mechanism was described in detail for disabling the upper hammer it will not be necessary to go through that entire mechanism again, a part of which is used to disable the feed of the payroll sheet when the items are printed on the checks.

It will be recalled that the shifting fork 563 (Figs. 9, 13 and 31) is shifted to the right, as viewed in Fig. 9 and to the bottom as viewed in Figs. 13 and 31, to disable the upper hammer 519. Secured to this shifting fork 563 is a shifting arm 638 which also has a slidable bearing on the shaft 203. This arm 638 is bifurcated to surround the stud 639 in axial alignment with the roller 581 carried by the arm 582, which arm it will be recalled is operated by the cam 580 to feed the payroll sheet. When the shifting fork 563 is shifted in the manner previously described at the time the items are printed, the arm 638 being secured thereto is likewise shifted and disengages the roller 581 from the cam 580 thereby disabling the feeding mechanism for the payroll sheet at the same time that the upper hammer 519 is disabled to prevent the printing of items on that sheet.

*Check and slip feeler mechanism*

Associated with the lower printer and check sheet is a feeler finger 640 (Figs. 25 and 27) carried by a slide 641 supported on studs 642 carried by a bracket 643 mounted on the machine base. The slide 641 carries a roller 644 projecting into a slot 645 of a cam plate 646 secured to a shaft 647 mounted in the bracket 643 and frame 200. Also secured to the shaft 647 is an arm 648 bifurcated to embrace a stud 649 in an arm 650 pivoted on the stud 439. The arm 650 is connected by a bail 652 to an arm 653 also pivoted on the stud 439. The bail 652 and arm 653 are merely for the purpose of given a longer bearing to the arm 650. Connected to the arm 650 is a link 654 pivoted to an arm 655 carried by the stud 391. The arm 655 is connected by a bail 658 to an arm 659 also pivoted on the stud 391. This arm 659 carries a pin 660 cooperating with a toe 661 on the hand or knee operated lever 408 previously described.

Figures 25, 26, 27:
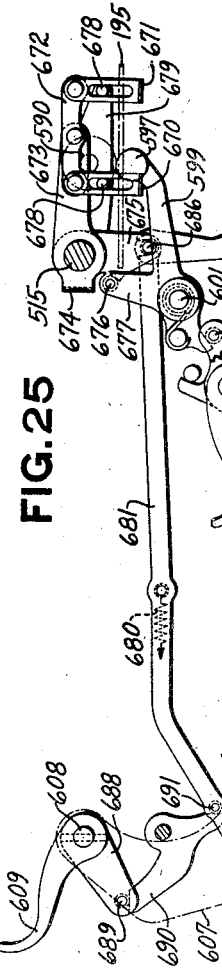
Fig. 25 shows the check feeler mechanism and also the slip or payroll sheet feeler mechanism.
Fig. 26 is a detail view of the machine lock controlled by the feelers for the check and also the slip or payroll sheet.
Fig. 27 is a detail view of the check feeler.

From the above description it will be clear that in order to put a sheet of checks in the machine the feeler finger 640 which as shown in Fig. 25 extends above the check table 182 must be lowered. This is accomplished through the toe 661 when the knee lever 185 or the hand lever 186 are operated. In that case the toe 661 rocks the arms 659 and 655 clockwise which moves the link 654 towards the left to rock the arm 650 clockwise. Through the stud 649 the arm 648, shaft 647 and cam plate 646 are rocked counter clockwise whereby the slot 645 lowers the finger slide 641 to bring the finger 640 beneath the table 182 so that a check sheet may be placed in the machine. Upon release of the knee lever 185 or hand lever 186 a spring 662 connected to a pitman which is pivoted to the arm 650 for a purpose to be later described, moves the arm 650 counter clockwise thus raising the feeler finger 640 until it strikes the underneath side of the paper. This spring 662, when the check sheet is removed, fully restores the feeler finger 640 to the position shown in Fig. 25.

While the check sheet is being fed there is also a means provided to overcome the tension of the spring 662 and draw the feeler finger 640 away from beneath the check sheet so that the sheet will not have to drag over said feeler finger. This mechanism includes the above mentioned pitman 663 which carries a roller 664 cooperating with a cam 665 secured to the printer shaft 203.

At the proper time and before the check sheet is fed the cam 665 through the roller 664 shifts the pitman 663 to the left, thus rocking the arm 650 clockwise whereupon the arm 648 is rocked counter clockwise to rock the cam plate 646 and lower the feeler slide 641 and feeler 640. Near the end of the operation as can be seen from the shape of the cam 665 the roller 664 and pitman 663 are permitted to be moved toward the right by the spring 662 to place the feeler finger 640 up through the table 182 into the position shown in Fig. 25.

Associated with the payroll sheet or other slip being used in the upper printer on the table 195 is a pair of feeler fingers 670 and 671 which project normally downwardly through the table 195. These feeler fingers 670 and 671 are carried on a freely pivoted lever 672 on an arm 673 supported on the shaft 515. A bail 674 connects the arm 673 with an arm 675 cooperating with a stud 676 in an arm 677 integral with the previously described arm 599 which carries the feeding roller 597.

It will be recalled that to place a payroll sheet or other slip in the upper printer the hand lever 602 is rocked counter clockwise thus rocking the arm 599 clockwise to separate the feeding rollers so that the sheet may be inserted therebetween. This clockwise movement of the arm 599 through the stud 676 rocks the arms 675 and 673 counter clockwise, thus raising both feeler fingers 670 and 671 above the table 195 so that the sheet may be placed in between the feed rollers.

The feeler fingers 670 and 671 are guided in their vertical movement by pins 678 carried by an arm 679 mounted on the shafts 515 and 590.

After the feeler fingers have been raised and the payroll sheet inserted the arm 602 is released and a spring 680 connected to a link 681 to be hereinafter described, lowers the feeler fingers 670 and 671 until they contact the payroll sheet.

To prevent the feeler fingers 670 and 671 from dragging on the sheet as it is being fed there is a means provided to raise the feelers off the sheet during such feeding operations. This means comprises a cam (not shown but identical with the cam 665 in Fig. 25) secured to the shaft 203 which cam cooperates with a roller (not shown but identical with the roller 664) carried by a short pitman 682 connected to one arm of a bail 683 pivoted on a shaft the outer end of which is supported by the frames 201 and 202 (Fig. 9). Also connected to this bail 683 is a link 684 pivoted to a lever 685 mounted on the frame 201. The upper end of the lever 685 embraces a stud 686 in the arm 675. When the cam (not shown) operates the pitman 682 is drawn to the left which also draws the link 684 likewise, thus rocking the lever 685 clockwise, which in turn rocks the arms 675 and 673 counter clockwise and raises the feeler fingers 670 and 671 off the payroll sheet or other slip in the upper printer.

After the slip or sheet is taken off the upper table 195 the spring 680 restores the feeler fingers to the positions shown in Fig. 25.

There is also means provided to raise the feeler fingers 670 and 671 from the slip when the slip is being fed by the hand lever 609 so that the slip will not drag over the feelers. This means includes an arm 688 (Figs. 13 and 25) secured to the shaft 608. This arm 688 carries a pin 689 cooperating with a lever 690 pivoted to the frame 201. The lower end of the lever 690 contacts a pin 691 of the link 681 which is connected to the arm 675 through the stud 686.

When the lever 609 is moved counter clockwise or downwardly in the manner previously described to manually feed the slip or payroll sheet the stud 689 rocks the lever 690 which in turn moves the link 681 toward the right, thus rocking the arms 675 and 673 and raising the feeler fingers 670 and 671 from the sheet.

By referring to Fig. 28 it will be noticed that there is a clearance between the arms 610 and 612 and that the stud 689 (Fig. 25) normally contacts the lever 690 and the lower end of this lever normally contacts the stud 691. This is to insure that the feeler fingers will be raised immediately by the movement of the lever 609 whereas there is a clearance between the arms 610 and 612 so that by the time the arm 610 contacts the arm 612 to operate the manual feed the feelers will have been lifted from the paper to prevent any dragging of the paper over them.

*Machine lock and interlock*

Means are provided to prevent accidental releasing of the machine when no check sheet is in the lower printer, also when no payroll sheet is on the upper table. Such a means is desirable in the present machine since if an amount is entered into the machine without both slips on their respective tables confusion in the payroll would result. Such confusion would result from either of the fact that the record would disclose that a check had been printed when no check was printed, or the checks could be printed without making a record thereof on the payroll sheet. Obviously such results are undesirable in a machine of this type.

By referring to Fig. 9 it will be recalled that when the machine is released the arm 63 is rocked in a counter clockwise direction. Pivoted to this arm is a link 694 in turn pivoted to a cam lever 695 pivoted on a stud 696 carried by the frame 58. A spring 697 normally tends to rock the lever 695 counter clockwise (Fig. 9). Cooperating with the cam lever 695 is a link 698 pivoted to a plunger 699 slidably mounted in the bracket 607 (Figs. 9 and 26). The end of the plunger 699 is cut away to leave a half-round nose 700, which is normally opposite a U-shaped recess 701 (Fig. 25) in an arm 702 pivoted on a shaft 703 carried by the frames 200 and 201. The arm 702 is held by a spring 704 in contact with a stud 705 on an arm 706 secured to the shaft 703. Also secured to the shaft 703 is a bifurcated arm 707 engaging a pin on a slide 708 pivoted to the pitman 663.

As long as the plunger 699 is opposite the arm 702 the plunger cannot be moved toward the right as viewed in Fig. 9 and consequently the arm 63 and shaft 64 cannot be rotated counter clockwise which is necessary to release the machine for operation. Also, as long as the feeler finger 640 is projecting through the plate 182 in Fig. 25, the pitman 663 will be in the position shown wherein the slide 708 is in its righthand position and the arm 702 is in front of the plunger 699. However, when either the knee lever 185 or hand lever 186 is operated to lower the feeler finger 640 and a slip is placed in the machine it will be recalled that the movement of either of those levers slides the link 654 and pitman 663 to the left, whereupon the arm 707 and shaft 703 and consequently the arm 706 are rocked in a clockwise direction whereupon the spring 704 removes the arm 702 from in front of the plunger 699. Insofar as the lower printer is concerned the plunger 699 is now free to be moved toward the right as viewed in Fig. 9 by its spring 697 and cam lever 695.

However, as above stated, it is also necessary that either a payroll sheet or other type of slip be on the upper table 195 before the machine can be released. Cooperating with this same plunger 699 is an arm 709 (Figs 25 and 26) which normally rests in a notch 710 in the plunger 699. This arm 709 is pivoted on a stud 711 carried by the frame 201, and is held by a spring 712 so that a stud 713 thereon normally contacts the lower part of an arm 714, the upper end of which is connected to the previously described link 681.

From a previous description it will be recalled that when the hand lever 602 is lowered to separate the upper feed rollers and withdraw the feeler fingers 670 and 671 from the table 195, the link 681 is moved to the right against the tension of the spring 680. This movement of the link rocks the arm 714 whereupon the spring 712 causes the pin 713 to follow the arm 714 and release the lower end of the arm 709 from the notch 710 in the plunger 699.

It can now be seen that the plunger is free to move toward the right, as viewed in Fig. 9, under the influence of its spring 697.

It might be well to state here that even though the upper feelers 670 and 671 are lowered slightly to contact the paper and the lower feeler finger 640 is raised to contact the paper, the arms 709 and 702 respectively are still free from the plunger 699 and consequently the machine can be released as the arm 63 and shaft 64 are free to be rotated in the manner previously described.

The above interlock applies when the total lever is in its add position or in its first position below add, or in its first position above add. The first position below add, it will be recalled, is the position into which the lever is moved to take the total of the several items being printed upon the check, such as shown in Fig. 36 and the first position above add is the position in which the sub-total is printed upon the voucher check shown in Fig. 35.

There is one other interlocking feature in connection with the plunger 699 to be considered, when the total lever is moved into its second or third positions above add, which are the sub-total positions for the totalizers associated with the second and third control rows and when the total lever is moved in its second and third positions below add, which are the total positions for the totalizers associated with the second and third rows of control keys.

Secured to the shaft 280 (Figs. 13, 17 and 25) which shaft it will be recalled is rotated by movement of the total lever, is a disk 715 which cooperates with a roller 716. In the positions of the disk 715 which correspond to the add position, the sub-total check position and the clear total check position of the total lever 115 the disk is cut away as shown in Fig. 25 so that the roller 716 can rest in the position shown in this figure. The cam 715 is in the "add" position. When the total lever is moved to either the first position above add or the first position below add, for the purpose of printing a sub-total, such as shown in Fig. 35, or the total of the amount of check items as shown in Fig. 36 the roller 716 is not moved and consequently the feeler 640 is not affected by that movement of the total lever, and therefore it will require a check in the lower printer on the table 182.

However, the positions of the disk 715 which correspond to the second and third positions above add and the second and third positions below add of the total lever are not cut away, and when the lever is moved to any one of these four positions the higher periphery of the disk 715 contacts the roller 716 and rocks the arm 655 clockwise, thus moving the link 654 to the left, which in turn moves the pitman 663 whereupon the slide 708 rocks the arm 707 and the spring 704 rocks the arm 702 away from in front of the plunger 699 so that the machine in this instance can be operated without any check or paper of any kind in the lower printer. However, it might be well to state at this point that whenever the total lever is moved into any one of those four positions just mentioned, all of the lower hammers are disabled by the means which has been previously described.

It might also be well to state here that the reason for having the slight recess 701 (Figs. 25 and 26) to cooperate with the plunger 699 instead of having the arm 702 cooperate with the true periphery of the front part of the plunger, is that should an attempt be made to release the machine without a sheet of checks being on the table 182, by the depression of any one of the previously described keys which function for this purpose the plunger 699 would be shifted very slightly toward the right as viewed in Fig. 9 and contact the side of the arm 702 and then a person might by moving the knee lever 185 or hand lever 186 lower the feeler finger 640 and cause the arm 702 to rock clockwise while the end of the plunger was bearing against the same, and thus the machine could be released without any check or slip of any kind being in the lower printer. However, with the nose 700 as it is shaped and the recess 701 it is perfectly clear that should an attempt be made to so release the machine the slight movement of the plunger 699 to the right would cause the nose to engage in the recess and lock on the edge of that recess to prevent any movement of the arm 702.

By referring to Figure 1 it can be seen that the mechanisms which have been previously described are housed by the usual type of cabinet and that while only three lock openings are shown that are not described it is to be distinctly understood that locks can be placed in any desirable positions on any part of the cabinet to prevent unauthorized persons from tampering with the several mechanisms within the cabinet.

What is claimed is:

1. In a machine adapted to print varying data at definite points on fixed forms, the combination of printing mechanism; a single feeding means including feeding rollers to grip the forms; and a plurality of manipulative control means for selecting various identifying data to be printed and for controlling the feeding means to feed the forms to the proper positions according to the data to be printed.

2. In a machine adapted to print varying data at definite points on fixed forms, the combination of printing mechanism; a single feeding means including feeding rollers to grip the forms; a plurality of manipulative item control means; manipulative total control means; and means controlled jointly by both of said manipulative means for controlling the feeding means to feed the forms to receive printing at said definite points as determined by the manipulative means operated.

3. In a machine adapted to print varying data at definite points on fixed forms, the combination of printing mechanism; a single feeding means including feeding rollers to grip the forms; a plurality of selective control devices for the feeding means; and a plurality of item entry control means for variably controlling the operation of the machine according to the data to be printed and for selecting the control devices which are to be effective.

4. In a machine adapted to print varying data at definite points on fixed forms, the combination of printing mechanism; feeding means including feeding rollers to grip the forms; a plurality of selective control devices for the feeding means; and a plurality of manipulative control means for selecting various identifying data to be printed and for simultaneously selecting one of said control devices.

5. In a machine adapted to print varying data at definite points on fixed forms, the combination of printing mechanism; feeding means including feeding rollers to grip the forms; manipulative item control means; manipulative total control means; a plurality of selective control devices for the feeding means; and means controlled jointly by the manipulative item control means and the manipulative total control means for selectively controlling the effectiveness of said devices.

6. In a machine adapted to print varying data at definite points on fixed forms, the combination of printing mechanism; manipulative control devices for determining the data to be printed; variably operable feeding means including feeding rollers to grip the forms; and differentially positionable means intermediate said devices and said feeding means for automatically varying the feed of said forms under control of said manipulative devices.

7. In a machine of the class described, the combination of means adapted to print varying data at definite points on fixed forms; feeding means; a variably operable actuator for the feeding means; a plurality of driving cams for said actuator and normally disconnected therefrom; and means for automatically connecting said actuator to one of said driving cams to feed the form definite distances to receive certain data.

8. In a machine of the class described, the combination of means adapted to print varying data at definite points on fixed forms; feeding means; a variably operable actuator for the feeding means; a plurality of driving cams for said actuator and normally disconnected therefrom; means for automatically connecting said actuator to one of said driving cams to feed the form definite distances to receive certain data; and means for automatically connecting said actuator to another of said driving cams to feed the form a different extent to receive other data.

9. In a machine of the class described, the combination of means adapted to print varying data at definite points on fixed forms; feeding means; a variably operable actuator for the feeding means; a plurality of driving cams for said actuator and normally disconnected therefrom; means for automatically connecting said actuator to one of said driving cams to feed the form definite distances to receive certain data; and means for automatically connecting said actuator to another of said driving cams to feed the form a greater extent to receive other data.

10. In a machine of the class described, the combination of means adapted to print varying data at definite points on fixed forms; feeding means; a variably operable actuator for the feeding means; a plurality of driving cams for said actuator and normally disconnected therefrom; means for automatically connecting said actuator to one of said driving cams to feed the form definite distances to receive certain data; and a plurality of means either of which is adapted to automatically connect said actuator to another of said cams to feed the form a different extent to receive other data.

11. In a machine of the class described, the combination of means adapted to print varying data at definite points on fixed forms; feeding means; a variably operable actuator for the feeding means; a plurality of driving cams for said actuator and normally disconnected therefrom; means for automatically connecting said actuator to one of said driving cams to feed the form definite distances to receive certain data, means for automatically connecting said actuator to another of said driving cams to feed the form a different extent to receive other data; and a bank of depressible control keys for controlling both of said automatic means.

12. In a machine of the class described, the combination of means adapted to print varying data at definite points on fixed forms; feeding means; a variably operable actuator for the feeding means; a plurality of driving cams for said actuator and normally disconnected therefrom; means for automatically connecting said actuator to one of said driving cams to feed the form definite distances to receive certain data; means for automatically connecting said actuator to another of said driving cams to feed the form a different extent to receive other data; and a bank of control keys certain of which controls the last mentioned automatic means and the remaining keys controlling the first mentioned automatic means.

13. In a machine of the class described, the combination of means adapted to print varying data at definite points on fixed forms; feeding means; a variably operable actuator for the feeding means; a plurality of driving means for said actuator but normally disconnected therefrom; means for connecting said actuator to one of said driving means to feed the forms definite distances to receive certain data; means for connecting said actuator to another of said driving means to feed the forms a different extent to receive other data; and a plurality of depressible keys and a shiftable lever for controlling both of said connecting means.

14. In a machine of the class described, the combination of means adapted to print varying data at definite points on fixed forms; feeding means; a variably operable actuator for the feeding means; a plurality of driving means for said actuator but normally disconnected therefrom; means for connecting said actuator to one of said driving means to feed the forms definite distances to receive certain data; a plurality of devices either of which is adapted to connect said actuator to another of said driving means; and a plurality of depressible control keys for determining whether said first mentioned connecting means or a certain one of said devices is to effect the connection between said actuator and the respective driving means mentioned.

15. In a machine of the class described, the combination of means adapted to print varying data at definite points on fixed forms; feeding means; a variably operable actuator for the feeding means; a plurality of driving means for said actuator but normally disconnected therefrom; means for connecting said actuator to one of said driving means to feed the forms definite distances to receive certain data; a plurality of devices either of which is adapted to connect said actuator to another of said driving means; a plurality of depressible control keys for determining whether said first mentioned connecting means or a certain one of said devices is to effect the connection between said actuator and the respective driving means mentioned; and a shiftable lever having several positions of adjustment for superseding the control of said depressible keys, for preventing operation of the first mentioned connecting means, for determining which of said devices is to effect the connection between said actuator and one of said driving means and for automatically preventing operation of the other of said devices.

16. In a machine of the class described, the combination of means adapted to print varying data at definite points on fixed forms; feeding means; a variably operable actuator for the feeding means; a plurality of driving means for said actuator but normally disconnected therefrom; means for connecting said actuator to one of said driving means to feed the forms definite distances to receive certain data; a plurality of devices either of which is adapted to connect said actuator to another of said driving means; and a shiftable lever for preventing operation of the first mentioned connecting means and for simultaneously selecting one of said devices to connect said actuator to another of said driving devices.

17. In a machine of the class described, the combination of means adapted to print varying data at definite points on fixed forms; feeding means; a variably operable actuator for the feeding means; a plurality of driving means for said actuator but normally disconnected therefrom; means for connecting said actuator to one of said driving means to feed the forms definite distances to receive certain data; means for connecting said actuator to another of said driving means to feed the forms a different extent to receive other data; and a shiftable lever for preventing operation of both of said connecting means.

18. In a machine of the class described, the combination of means adapted to print varying data at definite points on fixed forms; feeding means; a variably operable actuator for the feeding means; a plurality of driving means for said actuator but normally disconnected therefrom; means for connecting said actuator to one of said driving means to feed the forms definite distances to receive certain data; means for connecting said actuator to another of said driving means to feed the forms a different extent to receive other data; a shiftable lever for preventing operation of both of said connecting means; and means controlled by said lever for connecting the actuator to one of said driving means.

19. In a machine of the class described, the combination of means adapted to print varying data at definite points on fixed forms; feeding means; a variably operable actuator for the feeding means; a plurality of driving means for said actuator but normally disconnected therefrom; means for connecting said actuator to one of said driving means to feed the forms definite distances to receive certain data; means for connecting said actuator to another of said driving means to feed the forms a different extent to receive other data; a shiftable lever for preventing operation of both of said connecting means; and means under control of said lever for automatically connecting the actuator to the second mentioned driving means.

20. In a machine of the class described, the combination of means adapted to print varying data at definite points on fixed forms; feeding means; a variably operable actuator for the feeding means; a plurality of driving means for said actuator but normally disconnected therefrom; means for connecting said actuator to one of said driving means to feed the forms definite distances to receive certain data; a plurality of devices either of which is adapted to connect said actuator to another of said driving means; a shiftable lever for preventing operation of the first mentioned connecting means; and means controlled by said lever for selecting one of said devices to connect said actuator to another of said driving means.

21. In a machine of the class described, the combination of means adapted to printing varying data at definite points on fixed forms; feeding means; a variably operable actuator for the feeding means; a plurality of driving means for said actuator but normally disconnected therefrom; means for connecting said actuator to one of said driving means to feed the forms definite distances to receive certain data; means for connecting said actuator to another of said driving means to feed the forms a different extent to receive other data; a bank of manipulative devices; and means operable thereby for determining which of said connecting means is to be operated.

22. In a machine of the class described, the combination of means adapted to print varying data at definite points on fixed forms; feeding means; a variably operable actuator for the feeding means; a plurality of driving means for said actuator but normally disconnected therefrom; means for connecting said actuator to one of said driving means to feed the forms definite distances to receive certain data; means for connecting said actuator to another of said driving means to feed the forms a different extent to receive other data; a bank of manipulative devices; and means operable upon actuation of all but one of said devices for controlling the first mentioned connecting means to operate and for preventing operation of the second mentioned connecting means.

23. In a machine adapted to print varying data at definite points on fixed forms, the combination of printing mechanism; feeding means; a plurality of control devices for said feeding means; impression hammers adapted to be selectively operated; manipulative control means; and means intermediate the latter and said devices and the hammers for controlling the selection of said devices and the appropriate hammer or hammers under control of said manipulative devices.

24. In a machine adapted to print varying data at definite points on fixed forms, the combination of printing mechanism; feeding means; a plurality of control devices for said feeding means; impression hammers adapted to be selectively operated; manipulative control keys; a manipulative control lever; and means under control of said keys and said lever for controlling the selection of said devices and the appropriate hammer or hammers.

25. In a machine adapted to print varying data at definite points on fixed forms, the combination of printing mechanism; feeding means; a plurality of control devices for said feeding means; impression hammers adapted to be selectively operated; manipulative control keys; a manipulative control lever; a rockable member under control of certain of said control keys for determining the selection of one of said devices and the appropriate hammer; and means under control of said lever for determining the selection of another of said devices and the appropriate hammers.

26. In a machine of the class described, the combination of means adapted to print at definite positions on fixed forms; feeding means; impression hammers normally in a disabled condition; a plurality of normally ineffective driving means for the feeding means; and means for enabling a certain one of the impression hammers and for rendering effective a certain one of the driving means for the feeding means.

27. In a machine of the class described, the combination of means adapted to print at definite positions on fixed forms; feeding means; impression hammers normally in a disabled condition; a plurality of normally ineffective driving means for the feeding means; means for enabling a certain one of the impression hammers and for rendering effective a certain one of the driving means for the feeding means; and a plurality of manipulative devices for controlling said enabling means.

28. In a machine of the class described, the combination of means adapted to print at definite positions on fixed forms; feeding means; impression hammers normally in a disabled condition; a plurality of normally ineffective driving means for the feeding means; means for enabling a certain one of the impression hammers and for rendering effective a certain one of the driving means for the feeding means; and means for enabling the remaining impression hammers and for rendering effective another of the driving means for the feeding means.

29. In a machine of the class described, the combination of means adapted to print at definite positions on fixed forms; feeding means; impression hammers normally in a disabled condition; a plurality of normally ineffective driving means for the feeding means; means for enabling a certain one of the impression hammers and for rendering effective a certain one of the driving means for the feeding means; means for enabling the remaining impression hammers and for rendering effective another of the driving means for the feeding means; and manipulative devices for controlling both of said enabling means.

30. In a machine of the class described, the combination of means adapted to print at definite positions on fixed forms; feeding means; impression hammers normally in a disabled condition; a plurality of normally ineffective driving means for the feeding means; means for enabling a certain one of the impression hammers and for rendering effective a certain one of the driving means for the feeding means; means for enabling the remaining impression hammers and for rendering effective another of the driving means for the feeding means; and manipulative devices certain of which control the last mentioned enabling means, the remaining devices controlling the first mentioned enabling means.

31. In a machine of the class described, the combination of means adapted to print at definite positions on fixed forms; feeding means; impression hammers normally in a disabled condition; a plurality of normally ineffective driving means for the feeding means; means for enabling a certain one of the impression hammers and for rendering effective a certain one of the driving means for the feeding means; means for enabling the remaining impression hammers and for rendering effective another of the driving means for the feeding means; and a plurality of depressible control keys, a certain one of which controls the last mentioned enabling means, the remaining devices controlling the first mentioned enabling means.

32. In a machine of the class described, the combination of means adapted to print varying data at definite positions on fixed forms; feeding means; a plurality of driving means for the feeding means; an actuator for the feeding means adapted to be driven by either of said driving means but normally disconnected from both; impression hammers normally in a disabled condition; and means for enabling a certain one of said hammers and automatically connecting said actuator to one of said driving means.

33. In a machine of the class described, the combination of means adapted to print varying data at definite positions on fixed forms; feeding means; a plurality of driving means for the feeding means; an actuator for the feeding means adapted to be driven by either of said driving means but normally disconnected from both; impression hammers normally in a disabled condition; and means for enabling all of said hammers and automatically connecting said actuator to one of said driving means.

34. In a machine of the class described, the combination of means adapted to print varying data at definite positions on fixed forms; feeding means; a plurality of driving means for the feeding means; an actuator for the feeding means adapted to be driven by either of said driving means but normally disconnected from both; impression hammers normally in a disabled condition; means for enabling a certain one of said hammers and automatically connecting said actuator to one of said driving means; and means for enabling all of said hammers and automatically connecting said actuator to another of said driving means.

35. In a machine of the class described, the combination of means adapted to print varying data at definite positions on fixed forms; feeding means; a plurality of driving means for the feeding means; an actuator for the feeding means adapted to be driven by either of said driving means but normally disconnected from both; impression hammers; means normally rendering said hammers disabled; additional disabling means for certain of said hammers; means for rendering said first disabling means ineffective; and means for rendering said additional disabling means ineffective and for automatically connecting said actuator to one of said driving means.

36. In a machine of the class described, the combination of means adapted to print varying data at definite positions on fixed forms; feeding means; a plurality of driving means for the feeding means; an actuator for the feeding means adapted to be driven by either of said driving means but normally disconnected from both; impression hammers; means normally rendering said hammers disabled; additional disabling means for certain of said hammers; and means for automatically connecting said actuator to one of said driving means.

37. In a machine of the class described, the combination of means adapted to print varying data at definite positions on fixed forms; feeding means; a plurality of driving means for the feeding means; an actuator for the feeding means adapted to be driven by either of said driving means but normally disconnected from both; impression hammers; means normally rendering said hammers disabled; additional disabling means for certain of said hammers; means for automatically connecting said actuator to one of said driving means; and means for rendering said additional disabling means ineffective and for automatically connecting said actuator to another of said driving devices.

38. In a machine adapted to print varying data at definite points on fixed forms, the combination of printing mechanism; variable feeding means; a plurality of control devices for said feeding means; means for operating certain of said devices to feed said forms a definite distance to receive each of a plurality of impressions; and means for operating a certain other of said devices to feed said forms from any one of the positions of last impression to a definite position to receive an impression of a different nature, and then after the latter impression is made to operate said certain other device a second time to feed the forms to bring them to another definite position.

39. In a machine adapted to print varying data at definite points on fixed forms, the combination of printing mechanism; variable feeding means; a plurality of control devices for said feeding means; means for operating certain of said devices to feed said forms a definite distance to receive each of a plurality of impressions; means for operating a certain other of said devices to feed said forms from any one of the positions of last impression to a definite position to receive an impression of a different nature, and then after the latter impression is made to operate said certain other device a second time to feed the forms to bring them to another definite position; manipulative keys controlling the first mentioned operating means; and a manipulative member controlling the second mentioned operating means.

40. In a machine adapted to print varying data at definite points on fixed forms, the combination of printing mechanism; variable feeding means; a plurality of control devices for said feeding means; means for operating certain of said devices to feed said forms a definite distance to receive each of a plurality of impressions; means for operating a certain other of said devices to feed said forms from any one of the positions of last impression to a definite position to receive an impression of a different nature, and then after the latter impression is made to operate said certain other device a second time to feed the forms to bring them to another definite positon; manipulative keys controlling the first mentioned operating means; and a manipulative member having a normal position and a plurality of positions of adjustment, said member adapted to control the second mentioned operating means when the member is moved into one of its positions of adjustment.

41. In a machine adapted to print varying data at definite points on fixed forms, the combination of printing mechanism; variable feeding means; a plurality of control devices for said feeding means; manipulative means; an adjustable lever having a normal position and a plurality of positions of adjustment; means controlled by certain of said manipulative means when said lever is in its normal position for operating certain of said devices to feed the forms definite extents; and means controlled by another of said manipulative means when said lever is in its normal position for operating another of said devices to feed said forms definite but greater extents.

42. In a machine adapted to print varying data at definite points on fixed forms, the combination of printing mechanism; variable feeding means; a plurality of control devices for said feeding means; manipulative means; an adjustable lever having a normal position and a plurality of positions of adjustment; means controlled by certain of said manipulative means when said lever is in its normal position for operating certain of said devices to feed the forms definite extents; and means controlled by said lever when in one of its adjusted positions for operating another of said devices to feed the forms variable extents to a definite position and for then controlling the latter device to feed the forms definite extents.

43. In a machine adapted to print varying data at definite points on fixed forms, the combination of printing mechanism; variable feeding means; a plurality of control devices for said feeding means; manipulative means; an adjustable lever having a normal position and a plurality of positions of adjustment; means controlled by certain of said manipulative means when said lever is in its normal position for operating certain of said devices to feed the forms definite extents; and means controlled by said lever when in one of its positions of adjustment for operating another of said devices to feed the forms variable extents to a definite position, for then controlling the latter device to feed the forms a definite extent, for then controlling the latter device to feed the forms a second definite extent when in another of its positions of adjustment and for finally controlling said latter device to feed the forms a third definite extent when in its last mentioned adjusted position.

44. In a machine of the class described, the combination of means for printing data on record material; a normally locked operating means; releasing means therefor; a plurality of feeler devices; a slidable member adapted to be operated by said releasing means; a rockable member; and means intermediate both of said feeler devices and the rockable member for moving the latter into the path of the slidable member to prevent operation of said releasing means unless record material is in position to receive printing.

45. In a machine of the class described, the combination of means for printing data on record material; a normally locked operating means; releasing means therefor; means cooperating with said releasing means to prevent operation thereof unless record material is in position to be printed upon; a manually operable device having a normal position and a plurality of positions of adjustment each side of its normal position; and mechanism operated by said manually operable device when it is moved into certain of its positions on either side of normal for rendering said last mentioned means ineffective.

46. In a machine of the class described, the combination of means for printing data on record material; a normally locked operating means; releasing means therefor; a feeler device; means intermediate said device and said releasing means to prevent operation of the latter unless record material is in position to be printed upon; a manually operable device having a normal position and a plurality of positions of adjustment each side of its normal position; and a cam device operable by the manually operable device when the latter is moved into certain of its positions for rendering said intermediate means ineffective.

47. In a machine of the class described, the combination of means for printing data on record material; a normally locked operating means; releasing means therefor; a feeler device; a slidable member adapted to be operated by said releasing means; a rockable member; means operated by said feeler device for moving said rockable member into the path of the slidable member to prevent operation of said releasing means unless record material is in position to be printed upon; a manually operable device having a normal position and a plurality of positions of adjustment each side of its normal position; and a cam device operated by the manually operable device when the latter is moved into certain of its positions on either side of normal for moving said rockable member out of the path of said slidable member.

48. In a machine of the class described, the combination of means for printing data on a plurality of record materials; a normally locked operating means; releasing means therefor; a pair of feeler devices; a single feeler device; and means common to all of said feeler devices and adapted to be jointly controlled thereby to prevent operation of said releasing means unless all record materials are in proper positions to be printed upon.

49. In a machine of the class described, the combination of means for printing data on a plurality of record materials; a normally locked operating means; releasing means therefor; a pair of feeler devices; a rockable member controlled thereby; a single feeler device; a rockable member controlled thereby; and means common to both of said rockable members and controlled thereby to prevent operation of said releasing means unless all record materials are in proper positions to be printed upon.

50. In a machine of the class described, the combination of means for printing data on a plurality of record materials; a normally locked operating means; releasing means therefor; a pair of feeler devices; a rockable member controlled thereby; a single feeler device; a rockable member controlled thereby; and a slidable member adapted to be operated by said releasing means under control of both of said rockable members.

51. In a machine of the class described, the combination of means for printing data on a plurality of record materials; a normally locked operating means; releasing means therefor; a plurality of feeler devices adapted to cooperate with one record material when the latter is in position to be printed upon; a single feeler device adapted to cooperate with a second record material when the latter is in position to be printed upon; a shiftable device controlled by said plurality of feeler devices; an additional shiftable device controlled by said single feeler device; and means common to both of said shiftable devices and controlled thereby to prevent operation of said releasing means unless all of said record materials are in their proper positions to receive printing.

52. In a machine of the class described, the combination of means for printing data on a plurality of record materials; a normally locked operating means; releasing means therefor; a pair of feeler devices; a rockable member controlled thereby; a single feeler device; a rockable member controlled thereby; means common to both of said rockable members and controlled thereby to prevent operation of said releasing means unless all record materials are in proper positions to be printed upon; and a manually operable device for rendering ineffective the control of one of said rockable members over said common means.

53. In a machine of the class described, the combination of means for printing data on a plurality of record materials; a normally locked operating means; releasing means therefor; a pair of feeler devices; a rockable member controlled thereby; a single feeler device; a rockable member controlled thereby; means common to both of said rockable members and controlled thereby to prevent operation of said releasing means unless all record materials are in proper positions to be printed upon; a manually operable device; and a cam device operated by the manually operable device for moving one of said rockable members into an ineffective position relative to said mommon means.

54. In a machine of the class described, the combination of means for printing data on a plurality of record materials; a normally locked.operating means; releasing means therefor; a plurality of feeler devices adapted to cooperate with one record material when the latter is in position to be printed upon; a single feeler device adapted to cooperate with a second record material when the latter is in position to be printed upon; a shiftable device controlled by said plurality of feeler devices; an additional shiftable device controlled by said single feeler device; a manually operable device; and a cam device actuated by said manually operable device for moving said additional shiftable device into an ineffective position relative to said common means.

55. In a machine of the class described, the combination of means for printing data on a plurality of record materials; a normally locked operating means; releasing means therefor; a pair of feeler devices; a rockable member controlled thereby; a single feeler device; a rockable member controlled thereby; means common to both of said rockable members and controlled thereby to prevent operation of said releasing means unless all record materials are in proper positions to be printed upon; a manually operable device having a normal position and a plurality of positions of adjustment each side of its normal position; and means operated by the manually operable device when it is moved into certain of its positions on either side of normal for rocking one of said rockable members into an ineffective position relative to said common means.

EVERETT H. PLACKE.